United States Patent [19]
Kanatzidis et al.

[11] Patent Number: 6,013,204
[45] Date of Patent: Jan. 11, 2000

[54] ALKALI METAL CHALCOGENIDES OF BISMUTH ALONE OR WITH ANTIMONY

[75] Inventors: Mercouri G. Kanatzidis, Okemos; Duck Young Chung, Haslett, both of Mich.; Carl R. Kannewurf, Evanston, Ill.; Tim Hogan, Houston, Tex.; Lykourgos Iordanidis, East Lansing, Mich.

[73] Assignees: Board of Trustees Operating Michigan State University, East Lansing, Mich.; Northwestern University, Evanston, Ill.

[21] Appl. No.: 09/048,435

[22] Filed: Mar. 26, 1998

Related U.S. Application Data

[60] Provisional application No. 60/042,864, Mar. 28, 1997.

[51] Int. Cl.[7] .............................. H01B 1/00; G02B 5/20; C01B 19/00; C01B 17/00; H01M 6/18
[52] U.S. Cl. ......................... 252/584; 252/500; 423/508; 423/511; 429/191
[58] Field of Search .................... 252/584, 500; 423/508, 511; 429/191

[56] References Cited

U.S. PATENT DOCUMENTS

| | | |
|---|---|---|
| 3,352,640 | 11/1967 | Silverman . |
| 3,372,997 | 3/1968 | Bither et al. . |
| 3,448,053 | 6/1969 | Stamford et al. . |
| 3,519,402 | 7/1970 | Hulliger .................... 423/511 |
| 3,773,909 | 11/1973 | Pearlman et al. ........... 423/508 |
| 3,933,990 | 1/1976 | Gentile et al. . |
| 3,940,472 | 2/1976 | Donohue . |
| 4,176,170 | 11/1979 | Kasper et al. ............. 423/511 |
| 4,237,201 | 12/1980 | Rouxel et al. ............. 423/508 |
| 4,576,634 | 3/1986 | Badesha et al. . |
| 5,051,204 | 9/1991 | Ohsawa et al. ............ 423/508 |
| 5,300,274 | 4/1994 | Wei et al. ................. 423/511 |
| 5,531,936 | 7/1996 | Kanatzidis . |
| 5,618,471 | 4/1997 | Kanatzidis ................ 252/584 |

OTHER PUBLICATIONS

Jeon, H.–H., Ha, H.–P., Hyun, D.–B., Shim, J.–D., J. Phys. Chem. Solids 4:579–585 (1991).
Testardi, L.R., Bierly, H.N. Jr., Donahoe, F.J., J. Phys. Chem. Solids 23:1209 (1962).
Champness, C.H., Chiang, P.T., Parekh, P. Can. J. Phys. 43:653–659 (1965).
Champness, C.H., Chiang, P.T., Parekh, P. Can. J. Phys. 45:3611–3626 (1967).
Yim, W. M., J. Electrochem. Soc. 115:556–560 (1966).
Yim, W.M., et al., J. Mater Sci. 1:52–56 (1966).
Borkowski, K., et al., J. Mater. Res. Bull. 22:381–387 (1987).
Chizhevskaya, S.N., et al., Inorg. Mater. 31:1083–1095 (1995).
Horak, H., et al., J. Phys. Chem. Solids 47: 805– 809 (1986).
Lostak, P., et al., Phys Status Solidi 76:k71–k75 (1983).
Zalar, S.M., Adv. Energy Conv. 2:105–112 (1962).
Boon, J.W., Recl. Trav. Chim. Pays–Bas 63:32 (1944).
Glemser, O., et al., Anorg. Allg. Chem 279: 321–323 (1955).
Gattow, G., et al., Anorg. Allg. Chem. 279:324–327 (1955).
Voroshilov, Y. V., et al., Inorg. Mater. 8:777–778 (1972).
Kanischeva, A. S., et al., Kokl. Adad. Nauk. SSSR (Kryst.) 252:96–99 (1980).
Schmitz, D., et al., Naturforsch, 29b:438–439 (1974).
Cordier, G., et al., Rev. Chim Miner. 22:676–683 (1985).
Aurivillus, B., Acta Chem. Scand A37, 399–407 (1983).
Cordier. G., et al., Rev. chim. Miner. 22:631–638 (1985).
Volk, K., et al., Naturforsch. 35b, 136–140 (1980).

(List continued on next page.)

*Primary Examiner*—Philip Tucker
*Attorney, Agent, or Firm*—Ian C. McLeod

[57] ABSTRACT

A series of alkali metal bismuth or bismuth and antimony, antimony chalcogenides (Te or S) are described. The compounds have a unique combination electrical properties.

42 Claims, 23 Drawing Sheets

OTHER PUBLICATIONS

Eisenmann, B., et al., Naturforsch. 44b, 249–256 (1989).
Sheldrick, W.S., et al., Z. Anorg, Allg. Chem. 557, 98–104 (1988).
Sheldrick, W.S., et al., Z. Anorg. Allg. Chem. 536:114–118 (1986).
Sheldrick, W.S., et al., Z. anorg. Allg. Chem., 561: 149–156 (1988).
Cordier, G., et al., Rev. Chim. Miner. 18:218–223 (1981).
Dorrscheidt, W., et al., Z. Naturforsch. 36B 410–414 (1981).
Cordier, G., et al., Rev. Chim. Miner. 19:179–186 (1982).
McCarthy, T.J., et al., Chem. Mater. 5:331–340 (1993).
MaCarthy T.J., et al., J. Am. Chem. Soc. 117:1294–1301 (1995).
Kanatzidis, M. G., et al., Chem. Mater, 8:1465–1474 (1996).
Kanatzidis, M.G., et al., Mater. Res. Soc. Symp. Proc. 410:37–43 (1996).
Chung, D.-Y., et al., Mat. Res. Soc. Symp. Proc. 478: 333–344 (1997).
Chung, D.-Y., et al., J. Am. Chem. Soc., In Press.
Chung. D.-Y., et al., Mat. Res. Soc. Symp. Proc. 453:15–22 (1997).
McCarthy T.J., et al., Inorg. Chem. 33:1205–1211 (1994).
Choi, K.-S., et al., Inorg. Chem. 36:3804–3805 (1997).
Gildart, L., et al., J. Phys. Chem. Solids 28:246 (1961).
Nayak, B.B., et al., J. Mater. Sci., 21:46 (1986).
Wendlandt, W.W., et al., Relfectance Spectroscopy; Interscience Publishers: New York (1966).
Kotum, G., Reflectance Spectroscopy; Springer–Verlag: New York, (1969).
Tandon, S.P., et al., Phys, S.P., et al., Phys. Status Solidi 38:363–367 (1970).
Lyding, J.W., et al., IEEE Trans. Instrum. Meas. 37:76–80 (1988).
Chaikin, P.I., et al., Rev. Sci. Instrum. 46:218–220 (1975).
Klemm, W., et al., Anorg. Allg. Chem. 241:281–304 (1939).
Feher, F., Handbuck der Praparativen Anorganischen Chemie: Brauer, G., Ed.; Ferdinand Enke: Stuttgart, Germany p. 280–281 (1954).
Sheldrick, W.S., et al., Naturforsch 45B 1643–1646 (1990).
Smith, R.A., Semiconductors, 2nd ed.; Cambridge University Press; New York (1978).
CRC Handbook of Chemistry and Physics. 7th ed.; Lide D.R., ED.; CRC Press: Boca Raton, Fl. pp. 12–62 (1990).
Encyclopedia of Materials Science and Engineering, Thermo–electri Semiconductors; MIT Press; Cambridge, MA; Pergamon Press: Oxford, p. 4968 (1986).
Scherrer, H., et al., CRC Handbook of Thermolectrics; Rowe, D.M., Ed.; CRC Press: Boca Raton. FL pp. 211–237 (1995).
Slack, G.A., In CRC Handbook of Thermoelectrics; Rowe D.M., ED.; CRC Press: Boca Raton, FL pp. 407–440 (1995).
Kittel, C., Introduction to Solid State Physics, 6th ed.; John Wiley & Sons, Inc.: New York p. 150 (1986).
Voroshilov, Y.V., et al., Inorganic Materials 8 677–678 (1972).
Cordier, G., et al., A New Layer Selenido–bismutate (III) Rev Chim Miner 22: (5) 676–683 (1985).
McCarthy, T.J., et al., Chem. Mater. 5 331–340 (1993).
Eisenmann, G., et al., Z Kristallogr 197 (3–4) 257–258 (1991).
Bronger, W., et al., Z Anorg Allg Chem 622: (6) 1003–1005 Jun. (1996).

CsBi₄Te₆

$A_2Bi_8Se_{13}$ (A = Cs, Rb)

● Cs  ○ Se  • Bi

ALKALI METAL CHALCOGENIDES OF BISMUTH ALONE OR WITH ANTIMONY

CROSS-REFERENCE TO RELATED APPLICATION

This application is based upon Provisional Application Ser. No. 60/042,864, filed Mar. 28, 1997.

GOVERNMENT RIGHTS

This invention was supported under Office of Naval Research Contracts No. N 00014-94-1-0935 and N0014-96-0181. The U.S. government has certain rights in this invention.

BACKGROUND OF THE INVENTION (1) Summary of the Invention

The present invention relates to the preparation of alkali metal chalcogenides of bismuth alone or with antimony. In particular, the present invention relates to chalcogenides with a unique combination of properties at temperatures −100 to 150° C.

(2) Description of Related Art

Since the solid solutions of $Bi_{2-x}Sb_xTe_{3-y}Se_y$ (Jeon, H.-H., Ha, H.-P., Hyun, D.-B., Shim, J.-D., J. Phys. Chem. Solids 4 579–585 (1991); Testardi, L. R., Bierly, J. N. Jr., Donahoe, F. J., J. Phys. Chem. Solids 23 1209 (1962; Champness, C. H., Chiang, P. T., Parekh, P. Can. J. Phys. 43 653–659 (1965); and 45, 3611–3626 (1967)) were established as the leading materials available for near-room-temperature thermoelectric applications, there have been continuing efforts to find better thermoelectric materials. The challenge lies in achieving simultaneously high electrical conductivity, high thermoelectric power, and low thermal conductivity. These properties define the thermoelectric figure of merit $ZT=(S^2\sigma/\kappa)T$, wherein S is the thermopower, $\sigma$ the electrical conductivity, $\kappa$ the thermal conductivity, and T the temperature. All three of these properties are determined by the details of the electronic structure and scattering of charge carriers (electrons or holes) and thus are not independently controllable parameters. $\kappa$ also has a contribution from lattice vibrations, $\kappa_l$, the phonon thermal conductivity. Thus $\kappa=\kappa_e+\kappa_l$, where $\kappa_e$ is the carrier thermal conductivity. To date, most investigations were mainly focused on tuning (Yim, W. M., J. Electrochem. Soc. 115 556–560 (1968; Yim, W. M., et al., J. Mater. Sci. 1 52–65 (1966; and Borkowski, K., et al., J. Mater. Res. Bull. 22 381–387 (1987)) the composition of $Bi_2Q_3$ (Q=S, Se, Te) solid solutions, doping (Chizhevskaya, S. N., et al., Inorg. Mater. 31 1083–1095 (1995); Horak, J., et al., J. Phys. Chem. Solids 47 8805–809 (1986; Lostak, P., et al., Phys. Status Solidi 76, k71–k75 (1983); and Zalar, S. M., Adv. Energy Conv. 2 105–112 (1962)) $Bi_2Q_3$ with other heavy metals, and optimizing device design.

From a solid-state chemistry perspective, an intriguing feature of Bi/Sb chemistry is the stereochemical localization of their $ns^2$ lone-pair electrons, and the influence this exerts on the structure type and the electronic structure, and consequently the electronic properties of the resulting compounds. In this sense, alkali or alkaline earth metals introduced into the $Bi_2Q_3$ lattices rearrange the octahedrally coordinated Bi/Sb elements often causing the group 15 element (Sb or Bi) to exhibit varying degrees of $ns^2$ lone-pair stereochemical activity. In addition to the multitude of naturally occurring sulfosalt minerals, several synthetic ternary alkali or alkaline earth metal group 15 chalcogenides are known such as $ABQ_2$ (A=alkali metal; B=group 15 metal; Q=chalcogen), (Boon, J. W., Recl. Trav. Chim. Pays-Bas 63 32 (1944); Glemser, O., et al., Anorg. Allg. Chem. 279 321–323 (1955); Gattow, G., et al., Anorg. Allg. Chem. 279 324–327 (1955); and Voroshilov, Y. V., et al., Inorg. Mater. 8, 777–778 (1972)) $CsBi_3S_5$ (Kanischeva, A. S., et al., Kokl. Adad. Nauk. SSSR (Kryst.) 252, 96–99 (1980)), $RbBi_3S_5$ (Schmitz, D., et al., Naturforsch. 29b, 438–439 (1974)), $Cs_3Bi_7Se_{12}$ (Cordier, G., et al., Rev. Chim. Miner. 22 676–683 (1985)), $\alpha$, $\beta$-$BaBi_2S_4$ (Aurivillus, B., Acta Chem. Scand. A37, 399–407 (1983)), $Sr_4Bi_6Se_{13}$ (Cordier, G., et al., Rev. Chim. Miner. 22, 631–638 (1985)), $BaBiSe_3$ (Volk, K., et al., Naturforsch. 35b, 136–140 (1980)), $K_3SbSe_4$ (Eisenmann, B., et al., Naturforsch. 44b, 249–256 (1989)), $RbSb_3Se_5$ (Sheldrick, W. S., et al., Z. Anorg. Allg. Chem. 557, 98–104 (1988)), $Cs_2Sb_4Se_8$ Sheldrick, W. S., et al., Z. Anorg. Allg. Chem. 536, 114–118 (1986)), $Cs_3Sb_5Se_9$ (Sheldrick, W. S., et al., Z. Anorg. Allg. Chem., 561, 149–156 (1988)), $Ca_2Sb_2S_5$ (Cordier, G., et al., Rev. Chim. Miner. 18, 218–223 (1981)), $Ba_8Sb_6S_{17}$ (Dorrscheidt, W., et al., Z. Naturforsch. 36B, 410–414 (1981)), and $Sr_3Sb_4S_9$ (Cordier, G., et al., Rev. Chim. Miner. 19, 179–186 (1982)), which were prepared at high temperature by direct combination of the elements or alkali carbonates with Bi/Sb and S/Se.

The synthesis, structure and function of $\beta,\gamma$-$CsBiS_2$ (McCarthy, T. J., et al., Chem. Mater. 5, 331–340 (1993)), $KBi_3S_5$ (McCarthy, T. J., et al., J. Am. Chem. Soc. 117, 1294–1301 (1995)), $KBi_{6.33}S_{10}$ (Kanatzidis, M. G., et al., Chem. Mater. 8, 1465–1474 (1996); Kanatzidis, M. G., et al., Mater. Res. Soc. Symp. Proc. 410, 37–43 (1996); Chung, D.-Y, et al., Mat. Res. Soc. Symp. Proc. 478, 333–344 (1997)), $K_2Bi_8S_{13}$ (Kanatzidis, M.G., et al., Chem. Mater. 8 1465–1474 (1996); Kanatzidis, M.G., et al., Mater. Res. Soc. Symp. Proc. 410 37–43 (1996); Chung, D.-Y., et al., Mat. Res. Soc. Symp. Proc. 478 333–344 (1997)), $\alpha$-$K_2Bi_8Se_{13}$ (McCarthy, T. J., et al., Chem. Mater. 5, 331–340 (1993)), $BaBiTe_3$ (Chung, D-Y., et al., J. Am. Chem. Soc., in press; Chung, D.-Y., et al., Mat. Res. Soc. Symp. Proc. 453, 15–22 (1997)), $Cs_2Sb_4S_8$ (McCarthy, T. J., et al., Inorg. Chem. 33, 1205–1211 (1994)), $CsSbS_6$ (McCarthy, T. J., et al., Inorg. Chem. 33, 1205–1211 (1994)), $KThSb_2Se_6$ (Choi, K.-S., et al., Inorg. Chem. 36, 3804–3805 (1997)) and $BaLaBi_2Q_6$ (Q=S, Se) (Choi, K.-S., et al., Inorg. Chem. 36, 3804–3805 (1997)) were recently reported. Some of these compounds have highly promising thermoelectric properties (Kanatzidis, M. G., et al., Chem. Mater. 8, 1465–1474 (1996); Kanatzidis, M. G., et al., Mater. Res. Soc. Symp. Proc. 410, 37–43 (1996); Chung, D.-Y., et al., Mat. Res. Soc. Symp. Proc. 478, 333–344 (1997); Chung, D.-Y., et al., Mat. Res. Soc. Symp. Proc. 453, 15–22 (1997)). In a previous publication it was reported that $K_2Bi_8S_{13}$ possesses significantly higher electrical conductivity (~$10^2$ S/cm) at room temperature than that of its parent compound, $Bi_2S_3$ (Gildart, L., et al., J. Phys. Chem. Solids 28, 246 (1961; Nayak, B. B., et al., J. Mater. Sci., 21, 46 (1986)) and shows unusually high thermopower (Kanatzidis, M. G., et al., Chem. Mater. 8, 1465–1474 (1996); Kanatzidis, M. G., et al., Mater. Res. Soc. Symp. Proc. 410, 37–43 (1996); Chung, D.-Y., et al., Mat. Res. Soc. Symp. Proc. 478, 333–344 (1997). The Seebeck coefficient of $K_2Bi_8S_{13}$, however, differs greatly in samples of different preparation, which is believed to be due to the fact that in this compound there is occupancy disorder in some crystallographic sites between $K^+$ and $Bi^{3+}$. If the degree of disorder varies from sample to sample, it makes preparation of strictly identical samples difficult.

There is an extensive patent art. Of general interest in the preparation of such compounds are U.S. Pat. Nos. 3,352,640 to Silverman; U.S. Pat. No. 3,933,990 to Gentile et al; U.S. Pat. No. 3,940,472 to Donohue; U.S. Pat. No. 3,372,997 to Bither et al; U.S. Pat. No. 3,448,053 to Stamford et al; U.S. Pat. No. 4,576,634 to Badesha et al and U.S. Pat. No. 5,531,936 to Kanatzidis et al.

OBJECTS

It is therefore an object of the present invention to provide novel alkali Bi alone or with Sb chalcogenide compounds which have unique thermoelectrical properties. These and other objects will become increasingly apparent by reference to the following description and the drawings.

BRIEF DESCRIPTION OF THE DRAWINGS

FIGS. 6A, 6B, 6C, 6D show infrared diffuse reflectance spectra of: FIG. 6A $\beta$-$K_2Bi_8Se13$; and FIG. 6B $K_{2.5}Bi_{8.5}Se_{14}$. For comparison, the spectra of $Bi_2Te_3$ (FIG. 6C) and $Bi_2Se_3$ (FIG. 6D) are shown. The semiconductor energy gaps are indicated in the spectra.

DESCRIPTION OF PREFERRED EMBODIMENTS

Figure 1A:
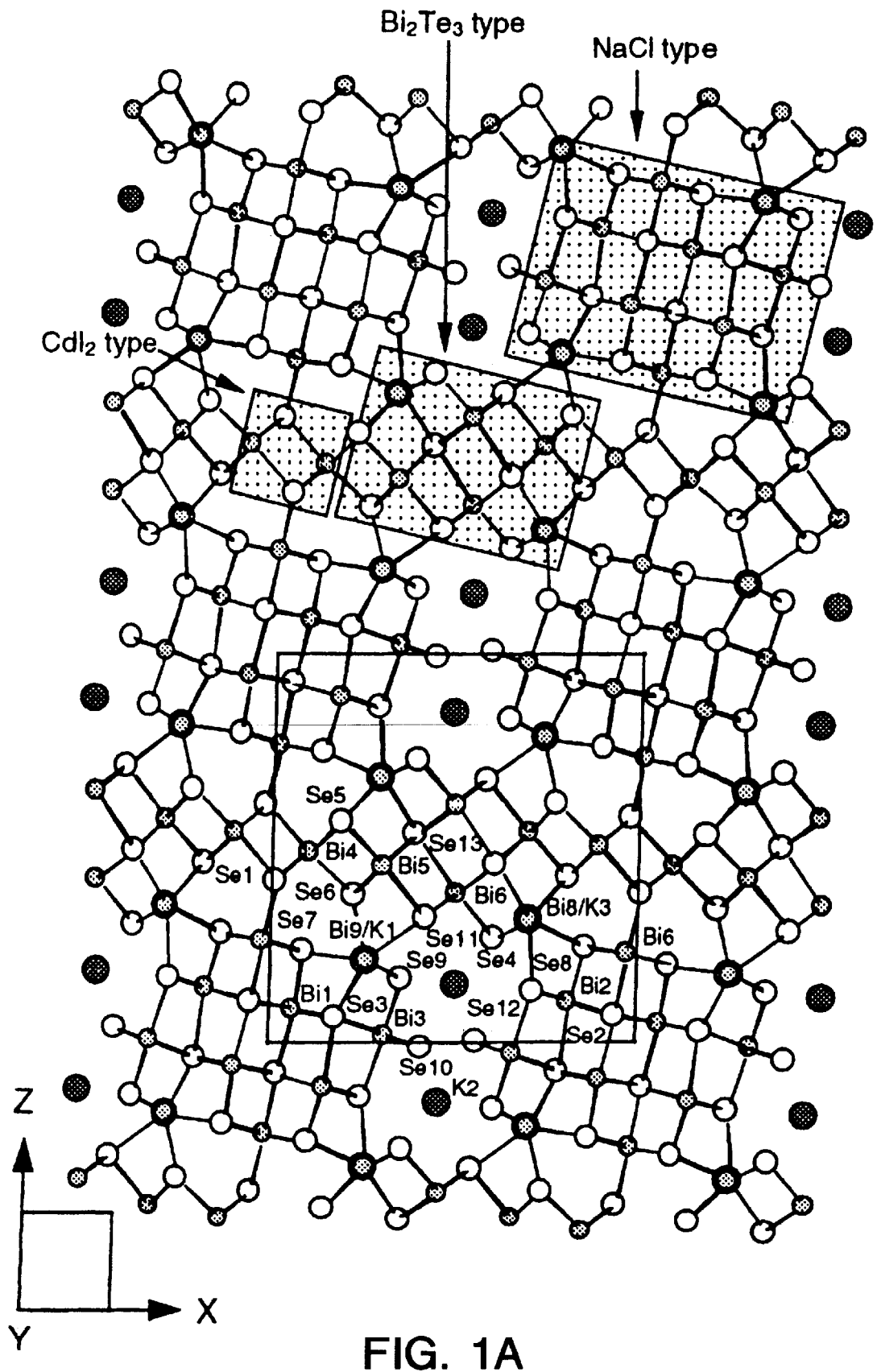
FIG. 1A shows projection of the structure of $\beta$-$K_2Bi_8Se_{13}$ viewed down the b-axis, NaCl—, $Bi_2Te_3$—, and $CdI_2$-type fragments are found in this framework are highlighted by the shaded areas.

The present invention relates to a chalcogenide compound of the formula $$A_xM_yQ_z$$

wherein A is selected from the group consisting of Li, Na, K, Rb, Cs and combinations thereof; M is selected from the group consisting of Bi and combinations of Bi and Sb; and Q is selected from the group consisting of Te, Se, S and combinations thereof wherein 1<x<6; 1<y<20; and 2<z<40, wherein the Q is negatively charged and charge balanced by A and M which are positively charged; wherein the chalcogenide has an energy band gaps 0.01 eV<Eg<1.2 eV, wherein eV is electron-volts and Eg is the energy gap, a thermoelectric power S>±50 $\mu$V/K, where V is volts and K is degrees Kelvin, electrical conductivity $\sigma$>100S/cm, where S is siemens and cm is centimeters and a thermal conductivity $\kappa$<3.0 W/mK, where W is watts, m is meters and K is degrees Kelvin.

Further, the present invention relates to an electrical device with electrical leads connected to a chalcogenide compound of the formula $$A_xM_yQ_z$$

wherein A is selected from the group consisting of Li, Na, K, Rb, Cs and combinations thereof; M is selected from the group consisting of Bi and combinations of Bi and Sb; and Q is selected from the group consisting of Te, Se, Se and combinations thereof, wherein 1<x<6; 1<y<20; and 2<z<40, wherein the Q is negatively charged and charge balanced by M and A which are positively charged; wherein the chalcogenide has an energy band gaps 0.01 eV<Eg<1.2 eV, wherein eV is electron-volts and Eg is the energy gap, a thermoelectric power S>±50 $\mu$V/K, where V is volts and K is degrees Kelvin, electrical conductivity $\sigma$>100 S/cm, where S is siemens and cm is centimeters and a thermal conductivity $\kappa$<3.0 W/mK, where W is watts, m is meters and K is degrees Kelvin.

Finally the present invention relates to a method for producing a modified electrical current which comprises:

(a) providing an electrical device with electrical leads connected to a chalcogenide compound of the formula $$A_xM_yQ_z$$

wherein A is selected from the group consisting of Li, Na, K, Rb, Cs and combinations thereof; M is selected from the group consisting of Bi and combinations of Bi and Sb; and Q is selected from the group consisting of Te, Se, Se and combinations thereof, wherein 1<x<6; 1<y<20; and 2<z<40, wherein the Q is negatively charged and charge balanced by M and A which are positively charged; wherein the chalcogenide has an energy band gaps 0.01 eV<Eg<1.2 eV, wherein eV is electron-volts and Eg is the energy gap, a thermoelectric power S>±50$\mu$V/K, where V is volts and K is degrees Kelvin, electrical conductivity $\sigma$>100 S/cm, where S is siemens and cm is centimeters and a thermal conductivity <3.0 W/mK, where W is watts, m is meters and K is degrees Kelvin; and (b) providing an electrical current through the device through the leads ,, whereby the current is modified by the chalcogenide compound.

The present invention thus relates to a new class of compounds comprised of alkali metals, bismuth, antimony, sulfur, selenium and tellurium are described with the formula $A_xM_yQ_z$ wherein A=Li, Na, K, Rb, Cs; M =Bi or Bi and Sb, Sb; Q=Te, Se, S; 1<x<6; 1<y <20; 2<z <40. These compounds feature M-Q frameworks which are negatively charged and they are charge balanced with positively charged alkali metals. The compounds are semiconductors and have narrow energy band-gaps (0.01 eV<Eg<1.2 eV), high thermoelectric power (S>±50 $\mu$V/K), high electrical conductivity ($\sigma\_$ >100 $\_$S/cm) and low thermal conductivity ($\kappa$<3.0 W/mK) at room temperature. These properties also could be improved by the introduction of new elements into the ternary $A_xM_yQ_z$ materials. The doped materials can be achieved by the introduction of transition metals and binary compound such as SnTe, $SbI_3$, $BiI_3$, $In_2Te_3$ so on, which lead to p-type (hole carrier) or n-type (electron carrier) materials. The solid solution materials of $A_xM_yQ_z$ (A=Li, Na, K, Rb, Cs; M=Bi or Bi and Sb; Q=Te, Se, S) are also included in the class of ternary compounds that are claimed. These doped and solid solution materials have lower thermal conductivities than $Bi_2Te_3$ and its alloys $Bi_{2-x}Sb_xTe_{3-x}Se_x$. These new materials may be used in thermoelectric power generation and thermoelectric cooling such as environmental cooling (CFC-free air conditioning), sample cooling, refrigeration and the cooling of electronic circuits and devices.

A synthesis program was initiated in an attempt to identify new multinary phases with Bi and Sb with narrow bandgaps which may be suitable as thermoelectric materials. This work was based on the proposition that materials with more complex compositions and structures may have complex electronic structures which may give rise to high thermoelectric powers, according to the Mott formula below, and at the same time possess low thermal conductivities. The thermopower S is given by $$S = \frac{\pi^2}{3}\frac{k^2 T}{e}\frac{d\ln\sigma(E)}{dE}\bigg|_{E=E_f}$$

where $\sigma$ (E) is the electrical conductivity determined as a function of band filling. The electronic conductivity $\sigma=\sigma$ (E)/$_{E=Ef}$ where $E_f$ is the Fermi energy. If the carrier scattering is independent of energy, then $\sigma$ (E) is just proportional to the density of states at E. In the general case, S is a measure of the difference in $\sigma$ (E) above and below the Fermi surface- specifically through the logarithmic derivative with respect to E, see the equation above. So by manipulating the energy dependence of $\sigma$ (E) one can control simultaneously $\sigma$ and S.

Physical Measurements. Electron Microscopy. Quantitative microprobe analyses of the compound were performed with a JEOL JSM-35C scanning electron microscope (SEM) equipped with a TRACOR NORTHERN energy-dispersive spectroscopy (EDS) detector. Data were acquired using an accelerating voltage of 20 kV and a 1 min accumulation time.

Differential Thermal Analysis. Differential thermal analysis (DTA) was performed with a computer-controlled Shimadzu DTA-50 thermal analyzer. The ground single crystals (~20 mg total mass) were sealed in quartz ampules under vacuum. A quartz ampule containing alumina of equal mass was sealed and placed on the reference side of the detector. The samples were heated to the desired temperature at 10° C./min and then isothermed for 3 min followed by cooling at 10° C./min to 100° C. and finally by rapid cooling to room temperature. The reported DTA temperature is the peak temperature. The DTA sample was examined by powder X-ray diffraction after the experiment.

Infrared Spectroscopy. Optical diffuse reflectance measurements were made on the finely ground sample at room temperature. The spectrum was recorded in the infrared region (6000-400 $cm^{-1}$) with the use of a Nicolet MAGNA-IR 750 Spectrometer equipped with a collector diffuse reflectance of Spectra-Tech. Inc. The measurement of diffuse reflectivity can be used to obtain values for the bandgap which agree rather well with the values obtained by absorption measurements from single crystals of the same material. Absorption ($\alpha$/S) data were calculated from the reflectance data using the Kubelka-Munk function: (Wendlandt, W. W., et al., Reflectance Spectroscopy; Interscience Publishers: New York, 1966); Kotum, G., Reflectance Spectroscopy; Springer-Verlag: New York, (1969); Tandon, S. P., et al., Phys. Status Solidi 38, 363–367 (1970)) $\alpha/S=(1-R)^2/2R$, where R is the reflectance at a given wavenumber, $\alpha$ is the absorption coefficient, and S is the scattering coefficient. The scattering coefficient has been shown to be practically wavenumber independent for particles larger than 5 $\mu$m, which is smaller than the particle size of the samples used here. The bandgap was determined as the intersection point between energy axis at the absorption offset and the line extrapolated from the linear portion of the absorption edge in a $\alpha$/S vs E (eV) plot.

Solid-State UV/Vis Spectroscopy. Optical diffuse reflectance measurements were made at room temperature with a Shimadzu UV-3101 PC double-beam, double-monochromator spectrophotometer operating in the 200–2500 nm region. The instrument was equipped with an integrating sphere and controlled by a personal computer. The measurement of diffuse reflectivity can be used to obtain values for the bandgap which agree rather well with values obtained by absorption measurements on single crystals of the same material. The digitized spectra were processed using the KALEIDAGRAPH software program. $BaSO_4$ powder was used as reference (100% reflectance). Absorption data were calculated from the reflectance data using the Kubelka-Munk function as above.

Charge-Transport and Thermal Conductivity Measurements. Dc electric conductivity and thermopower measurements were made on single crystals and polycrystalline compactions of the compound. Conductivity measurements were performed in the usual four-probe geometry with 60- and 25- $\mu$m gold wires used for the current and voltage electrodes, respectively. Measurements of the pellet cross-sectional area and voltage probe separation were made with a calibrated binocular microscope. Conductivity data were obtained with the computer-automated system described elsewhere (McCarthy, T. J., et al., Chem. Mater. 5: 331–340 (1993); and Lyding, J. W., et al., IEEE Trans. Instrum. Meas. 37: 76–80 (1988)). Thermoelectric power measurements were made by using a slow ac technique (McCarthy, T. J., et al., Chem. Mater. 5: 331–340 (1993); and Chaikin, P.I., et al., Rev. Sci. Instrum. 46: 218–220 (1975)) with 60 $\mu$m gold wires serving to support and conduct heat to the sample, and 10 $\mu$m wires to measure the voltage across the sample resulting from the applied temperature gradient. In both measurements, the gold electrodes were held in place on the sample with a conductive gold or silver paste.

Conductivity specimens were mounted on interchangeable sample holders, and thermopower specimens were mounted on a fixed sample holder/differential heater. Mounted samples were placed under vacuum ($\leq 10^{-3}$ Torr) and held at room temperature for 2–4 hours to cure the gold contacts. For some variable-temperature runs, data (conductivity or thermopower) were acquired during both sample cooling and warming to check reversibility. The temperature drift rate during an experiment was kept below 1 K/min. For single crystal measurements several variable-temperature runs were carried out for each sample to assess the consistency of the measured properties.

The thermal conductivity of polycrystalline samples was measured using a steady-state method. Samples were attached to the cold tip of a variable-temperature cryostat with the aid of Stycast epoxy. A small strain-gauge resistor serving as a heater was glued to the other end of the sample. Small crossbars made of flattened 0.25 mm diameter copper wire were attached with a tiny amount of Stycast at two positions along the length of a cylindrical sample. The samples were grown as cylindrical polycrystalline ingots by a recrystallization from the melt inside quartz tubes. Because the samples of $SbI_3$ doped $CsBi_4Te_6$ III decompose with time when molten (see discussion below), ingots from this compound were grown by rapid melting recrystallization procedure (<15 min) using an rf furnace. A pair of calibrated chromel-constantan differential thermocouples (25 $\mu$m diameter wires) was soldered to the copper crossbars to measure both the temperature difference $\Delta T$ and the temperature of the cold junction. Thermal conductivity was then determined from $\kappa = Ql/S\Delta T$, where Q is the power applied to the heater, l is the spacing between the crossbars, and S is the cross-sectional area of the sample. Measurements were carried out in a vacuum better than $10^{-6}$ Torr over the temperature range 4–300K.

Crystallography. The compounds were examined by X-ray powder diffraction for the purpose of phase purity and identification. Accurate $d_{hkl}$ spacings (Å) were obtained from the powder patterns recorded on a Rigaku Rotaflex powder X-ray diffractometer with Ni-filtered Cu K$\alpha$ radiation operating at 45 kV and 100 mA. The data were collected at a rate of 0.4°/min.

The intensities of three standard reflections were checked every 150 reflections to monitor crystal and instrument stability during single-crystal X-ray data collection. The structures of all compounds were solved by direct methods using the SHELXS-86 software program. After empirical absorption corrections based on $\psi$ scans, refinements with full-matrix least-squares techniques and Fourier synthesis calculations were carried out with the TEXSAN package of crystallographic programs.

EXAMPLES I TO IX $A_2Q$ (A=Li, Na, K, Rb, Cs; Q=Te, Se, S). Alkali metal chalcogenides are prepared by a stoichiometric reaction of alkali metal and elemental chalcogen in liquid $NH_3$ (Klemm, W., et al., Anorg. Allg. Chem. 241: 281–304 (1939); Feher, F., Handbuch der Praparativen Anorganischen Chemie: Brauer, G., Ed.; Ferdinand Enke: Stuttgart, Germany p280–281 (1954: and Sheldrick, W. S., et al., Naturforsch 45B, 1643–1646 (1990)). It is dried and ground to give a fine homogeneous powder.

Solid Solutions of $M_{2-y}M'_yQ_{3-z}Q'_z$ (M,M'=Bi, Sb; Q, Q'=S, Se, Te; 0<y<2; 0<z<3).

The solid solution $Bi_{2-y}Sb_yTe_{3-z}$, $Bi_{2-y}Sb_yTe_{3-z}S_z$, or $Bi_{2-y}Sb_ySe_{3-z}S_z$ (0<y<2; 0<z<3) can be prepared by high temperature (700° C.<T<1000° C.) reaction of a mixture of corresponding binary metal chalcogenides or elements.

A qualitative analysis with XRD and a quantitative microprobe analysis with a SEM/EDS system for all the compositions were carried out for the purpose of identification and purity. The solid solutions obtained are ground to a fine powder prior to use.

Synthesis of $A_yM_yQ_z$ (A=Li, Na, K, Rb, Cs; M =Bi, Sb; Q=Te, Se, S; 1<x<6; 1<y<20; 2<z<40) materials. Alkali metal chalcogenide $A_2O_x$ ($1 \leq x \leq 10$) and $M_{2-y}M'_yQ_{3-z}Q'_z$, ($0 \leq y \leq 2$, $0 \leq z \leq 3$) are used as starting materials for syntheses of the ternary $A_xM_yQ_z$ compounds with different compositions. The stoichiometric combination of the elements and/or the starting material mentioned above can be used for preparation of $A_xM_yQ_z$ compounds. The synthetic procedures for $CsBi_4Te_6$ and $A_2M_8Q_{13}$ (A=K, Rb, Cs; M=Bi, Sb; Q=Se, S) can also be applied to the preparations of all $A_xM_yQ_z$ compounds. The doped or the solid solution materials are prepared by reacting $M_{2-y}M'_yQ_{3-z}Q'_z$ (0<y<2, 0<z<3) with $A_2Q_z$ ($1 \leq z \leq 10$) or reacting $A_xM_yQ_z$ with the elemental dopants.

Reagents. Chemicals in this work were used as obtained: (i) bismuth powder, 99.999+% purity, −100 mesh, Cerac, Milwaukee, Wis., (ii) antimony metal, 99.999% purity, −325 mesh, Cerac Inc., Milwaukee, Wis., (iii) selenium powder, 99.95% purity, −200 mesh, Cerac Inc., Milwaukee, Wis., (iv) potassium metal, rod, 99.5% purity, Aldrich Chemical Co., Inc., Milwaukee, Wis.

1. Synthesis of $CsBi_4Te_6$ (I) $CsBi_4Te_6$ could be obtained in three different ways as below. All manipulations were carried out under a dry nitrogen atmosphere in a Vacuum Atmospheres Dri-Lab glovebox and in a Schlenk line.

Method A: Cs metal (0.1 g, 0.752 mmol) and $Bi_2Te_3$ (1.0 g, 1.249 mmol) were loaded separately into each end of U-shaped quartz tube (13 mm O.D.×11 mm I.D.). The tube was sealed under vacuum (<$10^{-4}$ Torr) at liquid $N_2$ temperature to avoid evaporation of Cs metal.

It was heated to 250° C. over 24 hours and isothermed there for 24 hours followed by heating again to 580° C. over 24 h. After 2 days at 580° C., it was cooled to 50° C. in 12 h. The product was washed with several portion of degassed methanol under a nitrogen atmosphere until the solvent remained clear. After being washed with diethyl ether and dried, a chunk of silvery white needles of $CsBi_4Te_6$ were obtained quantitatively.

Method B: $Cs_2Te$ (0.192 g, 0.488 mmol) and $Bi_2Te_3$ (0.6 g, 0.749 mmol) were thoroughly mixed and loaded into an alumina thimble (10 mm (O.D.×7 mm I.D. ×75 mm), which was plugged with a graphite lid and subsequently sealed inside a carbon coated quartz tube (13 mm O.D.×11 mm I.D.) at a residual pressure of <$10^{-4}$ Torr. The mixture was heated to 300° C. over 24 h followed by heating to 700° C. at a rate of ~3° C./h. It was isothermed there for 2.5 days and then slowly cooled to 300° C. at a rate of −4° C./h followed by cooling to 50° C. in 12 h. The product was isolated by dissolving away the residual $Cs_2Te$ with several portions of degassed dimethylformamide under a nitrogen atmosphere until the solvent remained clear, indicating complete removal of the $Cs_2Te$. After being washed with diethyl ether and dried, shiny silvery white needles of $CsBi_4Te_6$ were obtained quantitatively.

Method C: A mixture of Cs metal (0.033 g, 0.248 mmol) and $Bi_2Te_3$ (0.3 g, 0.375 mmol) was loaded and sealed by the same procedure as above. The mixture was stepwise heated by 100° C. at a rate of 5° C./h and isothermed for 6 h at each step. At 600° C., it was kept for one day followed by slow cooling at a rate of −4° C./h to 150° C. The alumina thimble containing the product was left overnight in dried and degassed methanol under a nitrogen atmosphere to remove the excess Cs metal. The relatively large crystals (>5 mm long) of $CsBi_4Te_6$ were taken out of the thimble by carefully scratching out with a spatula and washed with methanol.

The purity and homogeneity was confirmed by comparison of X-ray powder diffraction (XRD) to that calculated from single crystal data. A quantitative analysis by Energy Dispersive Spectroscopy (EDS) using a Scanning Electron Microscope (SEM) was performed on a number of crystals obtained from each method and showed an average ratio of $Cs_{0.48}Bi_2Te_{3.3}$. The melting point of $CsBi_4Te_6$ was measured by a Differential Thermal Analysis (DTA) to be 545° C.

1A. Synthesis of $SbI_3$ doped $CsBi_4Te_6$ (III) Cs metal (0.1 g, 0.752 mmol) and $SbI_3$ (0.05–5.0%) doped $Bi_2Te_3$ (1.0 g, 1.249 mmol) were loaded separately into each end of U-shaped quartz tube (13 mm O.D.×11 mm I.D.). The tube was sealed under vacuum (<$10^{-4}$ Torr) at liquid $N_2$ temperature. It was heated to 250° C. over 24 h and isothermed there for 24 h followed by heating again to 580° C. over 24 h. After 2 days at 580° C., it was cooled to 50° C. in 12 h. The product was washed with several portion of degassed methanol under a nitrogen atmosphere until the solvent remained clear. After being washed with diethyl ether and dried, a chunk of shiny silvery white needles of doped $CsBi_4Te_6$ were obtained quantitatively.

2. Synthesis of $CsBi_4Te_{5.5}Se_{0.5}$ (II) A mixture of $Cs_2Se$ (0.069 g, 0.2 mmol), $Cs_2Te$ (0.039 g, 0.1 mmol) and $Bi_2Te_3$ (0.320 g, 0.4 mmol) was loaded into an alumina thimble (10 mm O.D.×7 mm I.D.×75 mm), which was plugged with a graphite lid and subsequently sealed inside a carbon coated quartz tube (13 mm O.D.×11 mm I.D.) at a residual pressure of <$10^{-4}$ Torr. The mixture was heated to 650° C. at a rate of 4° C./h and isothermed there for one day. It was slowly cooled to 200° C. at a rate of −4° C./h followed by cooling to 50° C. in 12 h. The product was isolated in dimethylformamide as above. The shiny silvery white needles of $CsBi_4Te_6$ phase were obtained quantitatively. SEM/EDS and XRD analysis showed the $CsBi_4Te_6$ phase was doped with ~8.3 at. % Se.

3. Synthesis of $\beta$-$K_2Bi_8Se_{13}$ (IV) A mixture of $K_2Se$ 0.043 g (0.274 mmol), elemental Bi 0.2 g (0.957 mmol), and elemental Se 0.130 g (1.646 mmol) was loaded into a carbon-coated quartz tube (9 mm diameter) and subsequently flame-sealed at a residual pressure of <$10^{-4}$ Torr. The mixture was heated to 600° C. over 24 h and kept there for 6 days, followed by slowly cooling to 200° C. at a rate of −4° C./h and then to 50° C. in 12 h. Metallic black needles of $\beta$-$K_2Bi_8Se_{13}$ were obtained quantitatively by isolation in dimethylformamide (DMF) and washing with diethyl ether. A quantitative microprobe analysis with a SEM/EDS system was performed on several crystals to give an approximate ratio of $K_{1.8}Bi_{8.6}Se13$.

4. Synthesis of $K_{2.5}Bi_{8.5}Se_{14}$ (V) A mixture of $K_2Se$ 0.045 g (0.286 mmol), elemental Bi 0.2 g (0.957 mmol), and elemental Se 0.125 g (1.583 mmol) was loaded into a Pyrex tube (9 mm diameter) and subsequently flame-sealed at a residual pressure of <$10^{-3}$ Torr. The mixture was heated to 530° C. over 12 h and kept there for 5 days, followed by slowly cooling to 200° C. at a rate of −2° C./h and then to 50° C. in 12 h. Metallic black microneedles mixed with black powder were obtained by the isolation as above in DMF. Dried product was homogeneously ground and loaded into a quartz tube and sealed at <$10^{-4}$ Torr. After recrystallizing the mixture by melting at 750° C., shiny lump of black needles of $K_{2.5}Bi_{8.5}Se_{14}$ was obtained in a pure state. SEM/EDS analysis on several crystals showed the approximate ratio of $K_{2.9}Bi_{9.0}Se_{14}$.

5. Synthesis of $Cs_2Bi_8Se_{13}$

VI. A mixture of 0.055 g (0.160 mmol) $Cs_2Se$, 0.242 g (1.158, mmol) Bi and 0.138 g (1.748 mmol) Se was transferred to a carbon coated quartz tube which was flame-sealed under high vacuum (<$10^{-4}$ Torr). The tube was heated for 90 h at 800° C. and cooled to 500° C. at 10° C./h and then to 50° C. in 10 h. The product consisted of silver-gray chunk with thin needles growing on its top and was isolated by washing with water, methanol and ether. SEM/EDS analysis on several crystals showed the approximate ratio of $Cs_{1.2}Bi_{6.2}Se_{13.0}$.

6. Synthesis of $Rb_2Bi_8Se_{13}$ (VII). A mixture of $Rb_2Se$ 0.065 g (0.260 mmol), elemental Bi 0.334 g (1.600 mmol), and elemental Se 0.190 g (2.400 mmol) was transferred to a carbon coated quartz tube and flame-sealed under high vacuum (<$10^{-4}$ Torr). The tub o was heated for 90 h at 800° C. and cooled to 500° C. at 10° C./h and then to 50° C. in 10 h. The product consisted of silver-gray chunk with thin needles growing on its top and was isolated by washing with water, methanol and ether. SEM/EDS analysis on several crystals showed the approximate ratio of $Rb_{1.7}Bi_{9.8}Se_{13}$. X-ray powder diffraction revealed that the phase is isostructural with $Cs_2Bi_8Se_{13}$.

7. Synthesis of $K_2Bi_{8-y}Sb_ySe_{13}$ (0<y<8)

(VIII). A mixture of $\beta$-$K_2Bi_8Se_{13}$ and $K_2Sb_8Se_{13}$ with the desired ratio was loaded in a quartz tube and flame-sealed at a residual pressure of <$10^{-4}$ Torr. The mixture was melted at 850° C. and recrystallized by a slow cooling. The purity and homogeneity of the product was confirmed by X-ray powder diffraction (XRD). A quantitative analysis by Energy Dispersive Spectroscopy (EDS) using a Scanning Electron Microscope (SEM) was also performed on a number of crystals obtained.

8. Synthesis of $Rb_{0.5}Bi_{1.83}Te_3$. (IX)

$Rb_{0.5}Bi_{1.83}Te_3$ can be synthesized by the same method as those for $CsBi_4Te_6$ using molar ratio of 0.7 to 1 of Rb to $B_2Te_3Rb_4$ to $Bi_2Te_3$ (method C for $CsBi_4Te_6$) or a molar ratio of 1.2 to 1 $Rb_2Te$ to $Bi_2Te_3$ (method B for $CsBi_4Te_6$).

Sample Preparation for the Measurements of Thermoelectric Properties.

I. Hot Pressed and Annealed Pellet Giving n-Type $CsBi_4Te_6$

Finely ground $CsBi_4Te_6$ powder was pressed at 1500 ton/$m^2$ in the dies (pellet size=2 mm×5 mm×2 mm) heated to 200° C. and stayed at that pressure for 30 min. The pellet was annealed at 200° C. for 8 h under ~$10^{-3}$ Torr.

II. Preparation of Ingot Sample

Fine powdered sample was packed in a BN (Boron Nitride) thimble (4 mm O.D.×2 mm I.D.×50 mm long). It is plugged with a BN lid and subsequently sealed inside a quartz tube (11 mm O.D. ×9 mm I.D.) at a residual pressure of <$10^{-4}$. The tube was loaded in a vertical furnace of which the hottest zone was set to 50° C. higher than the melting point of the material, and passed through the hottest zone at a transport rate of 5 mm/h.

Figure 1B:
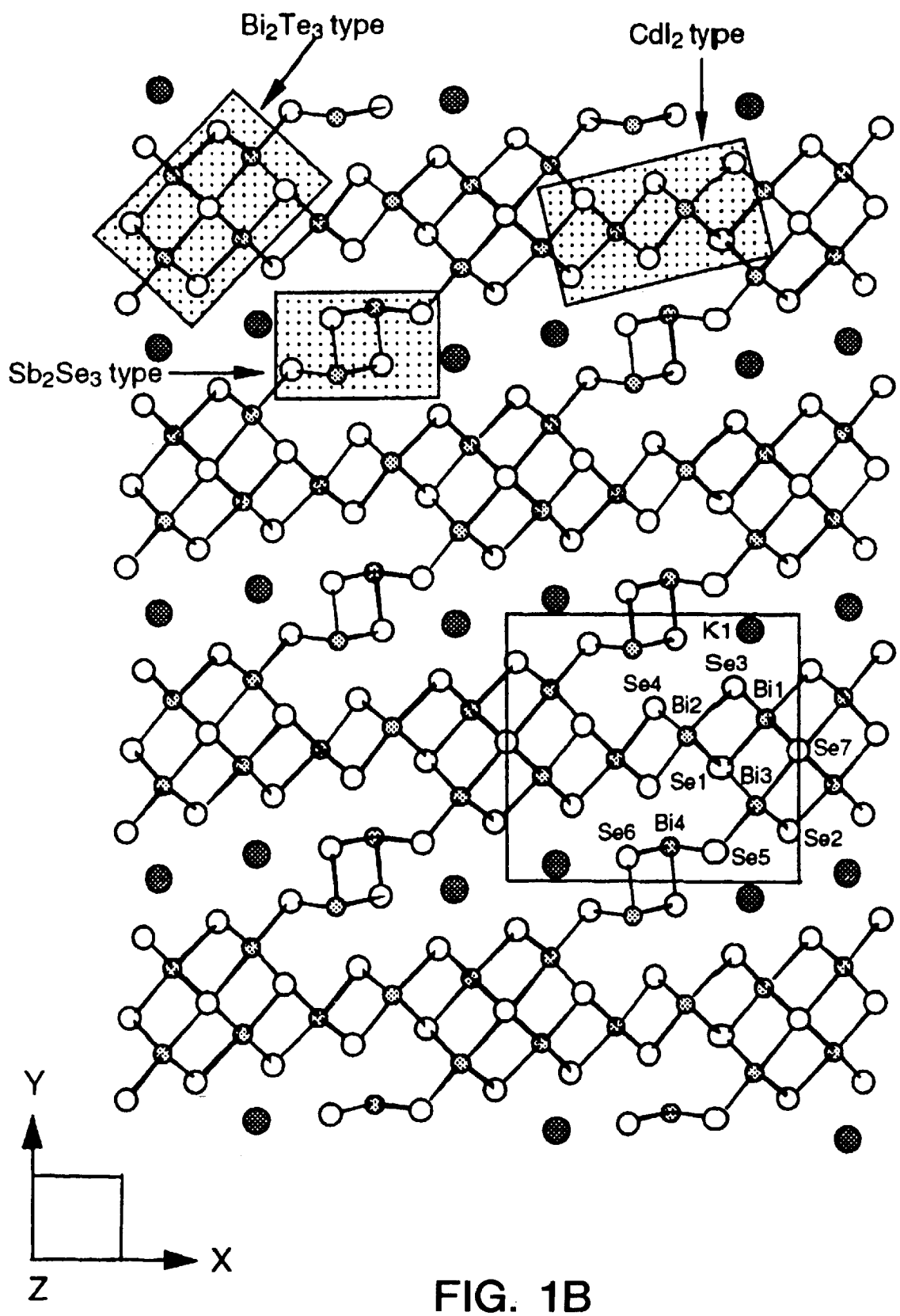
FIG. 1B shows projection of the structure of $\alpha$-$K_2Bi_8Se_{13}$ viewed down the b-axis, $Sb_2Se_3$—, $Bi_2Te_3$—, and $CdI_2$-type building block in the structure are highlighted by the shaded areas.

$\beta$-$K_2Bi_8Se_{13}$ (IV), $K_{2.5}Bi_{8.5}Se_{14}$ (V) were synthesized by a molten flux method. The black needles of compound IV were formed at 600° C. and crystallized in the monoclinic $P2_1/m$ space group (No. 11) with a=17.492(3) Å, b=4.205(1) Å, c=18.461(4) Å, $\beta$=90.49(2)°. The final $R/R_w$=6.7/5.7%. Compound $\alpha$-$K_2Bi_8Se_{13}$ is isostructural to IV. See FIGS. 1A and 1B for the proposed structures. IV is isostructural with $K_2Bi_8S_{13}$ which is composed of NaCl—, $Bi_2Te_3$—, and $CdI_2$-type units connecting to form $K^+$-filled channels. The thin black needles of V are obtained at 530° C. crystallize in the same space group $P2_1/m$ with a=17.534(4) Å, b=4.206 (1) Å, c=21.387(5) Å, $\beta$=109.65(2)° and a=17.265(3) Å, b=4.0801(9) Å, c=21.280(3) Å, $\beta$=109.31(1)°, respectively. The final $R/R_w$=6.3/8.3% and 5.1/3.6%. Compound VI is isostructural and potassium and bismuth atoms are disordered over two crystallographic sites. The structure type is very closely related to that of IV. Electrical conductivity and thermopower measurements show semiconductor behavior with ~250 S/cm and ~−200 μV/K for a single crystal of IV and ~150 S/cm and ~−100 μV/K for a polycrystalline ingot of V at room temperature.

The effect of vacuum annealing on these compounds is explored. The optical bandgaps of all compounds were determined to be 0.59, 0.78, 0.56, and 0.82 eV, respectively. The thermal conductivities of melt-grown polycrystalline ingots of IV and V are reported.

Structure Solution of $\beta K_2Bi_8Se_{13}$

Figure 2:
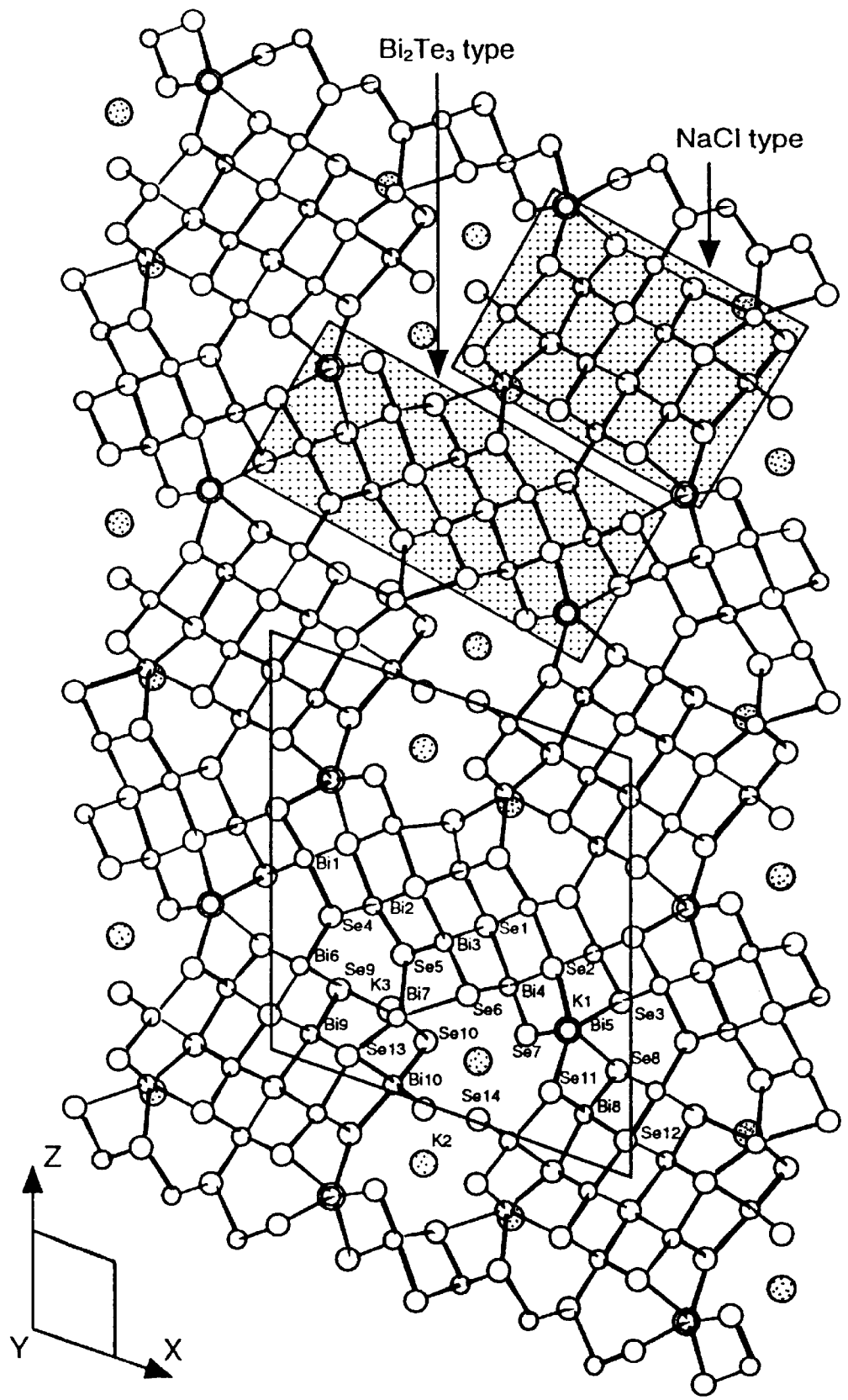
FIG. 2 shows the structure of $K_{2.5}Bi_{8.5}Se_{14}$ projected down the b-axis. The isostructural compound $K_{2.5}Sb_{8.5}Se_{14}$ has the same atomic labeling.

A single crystal of $\beta$-$K_2Bi_8Se_{13}$ with dimensions 0.02× 0.08×0.26 mm was mounted on the tip of a glass fiber. The crystallographic data were collected at room temperature on a Rigaku AFC6S four-circle automated diffractometer equipped with a graphite-crystal monochromator. No significant decay was observed during the data collection period. The data were collected with the $\theta/2\theta$ scan technique. The unit-cell parameters were determined from a least-squares refinement using the $2\theta$ angles of 15 carefully centered reflections in the $6 \leq 2\theta \leq 20°$ range. Eight Bi atoms, thirteen Se atoms; and two K atoms were located in mirror planes. After least-squares refinement, the isotropic temperature factor for Bi(8) was high at 7.7 Å (Yim, W. M., et al., Electrochem. Soc. 115: 556–560 (1968); Yim, W. M., et al., J. Mater. Sci. 1: 52–65 (1966); Borkowski, K., et al., J. Mater Res. Bull. 22: 381–387 (1987)) while the isotropic temperature factor for K(1) was negative at $-0.8$Å$^2$ ($R/R_w =$ 10.2/9.7%). Refinement of the occupancies of Bi(8) and K(1) showed a large decrease for Bi(8) (0.335) and a large increase for K(1)(1.158). The ideal occupancy for both sites is 0.500. Since the coordination environment of the two sites is similar, a model with Bi and K disordered between the two sites was applied. Successive refinements using this model resulted in a formula of $K_{2.06}Bi_{7.94}Se_{13}$ where an additional +0.12 charge is needed for electroneutrality ($R/R_w=8.8/8.5\%$). The occupancies were founded off and fixed to $K_2Bi_8Se_{13}$ with no significant change in the R values. The atomic composition of the Bi-rich site is 62% Bi and 38% K while the opposite applies for the K-rich site. All atoms were refined anisotropically ($R/R_w=7.8/6.8\%$). Averaging the data improved the $R/R_w$ values 6.7/5.7%. As a check for Bi—K disorder in the K(2) site, the occupancy of the K(2) was refined and revealed no change, suggesting that this site is fully occupied by K. The proposed structure is shown in FIG. 2.

Structure Solution of $K_{2.5}Bi_{8.5}Se_{14}$

A single crystal with dimensions 0.02×0.08×0.51 mm was mounted on a glass fiber and the crystallographic data were collected at room temperature on a RIGAKU AFC6S diffractometer by the same procedure as above. Intensity data were collected using the $\theta/2\theta$ scan mode. The unit-cell parameters were determined from a least-squares refinement using the $\theta$ angles of 17 carefully centered reflections in the $8 \geq 2\theta \geq 28°$ C. range. An empirical absorption correction based on $\psi$ scans was applied to the data. Eight Bi atoms, fourteen Se atoms, and three K atoms were found on mirror planes. After least-squares refinement, the isotropic temperature factors for K(1) and K(3) were negative at $-1.01$ and $-0.90$ Å$^2$ respectively ($R/R_w=10.0/12.6\%$). The occupancies and temperature factors were refined to give values of 0.87/1.86Å$^2$ for K(1) and 0.96/2.79Å$^2$ for K(3) (full occupancy of a special position on mirror plane is 0.5) with $R/R_w=9.3/11.1\%$. At a distance of 0.48 Å from K(3), there was a high electron density (23.09 e/Å$^3$) peak which behaved very well as a disordered Bi atom. This suggested that a structural model with K and Bi disordered over these two K sites seemed reasonable. Therefore, Bi(7) was assigned to be disordered with K(3) and Bi(5) disordered with K(1). Successive refinements, taking into account this model, resulted in reasonable occupancies and temperature factors which were 0.38/2.74Å$^2$ for K(1), 0.12/2.74Å for Bi(5), 0.36/1.41Å$^2$ for K(3), and 0.14/0.93Å$^2$ for Bi(7) with $R/R_w=7.5/9.5\%$ and thus a formula $K_{2.48}Bi_{8.52}Se_{14}$. The occupancies were rounded off and fixed to obtain electroneutrality. Least-squares refinement gave $K_{2.5}Bi_{8.5}Se_{14}$ with $R/_w=7.4/9.3\%$. A DIFABS correction was applied to the isotropically refined data ($R/R_w=6.8/8.8\%$). All atoms except the disordered atoms were refined anisotropically ($R/R_w=6.3/8.3\%$).

Table 1 shows the crystal data and the details of the structure analysis for all compounds.

TABLE I

Summary of Crystallographic Data and Structural Analysis for $\beta$-$K_2Bi_8Se_{13}$, $K_{2.5}Bi_{8.5}Se_{14}$, and $K_{2.5}Sb_{8.5}Se_{14}$

| | $\beta$-$K_2Bi_8Se_{13}$ | $K_{2.5}Bi_{8.5}Se_{14}$ | $K_{2.5}Sb_{8.5}Se_{14}$ |
|---|---|---|---|
| formula | | | |
| formula weight | 2776.52 | 2979.52 | 2238.06 |
| crystal habit | black needle | black needle | black needle |
| space group | P2$_1$/m (No. 11) | P2$_1$/m (No. 11) | P2$_1$/m (No. 11) |
| a, Å | 17.492(3) | 17.535(4) | 17.265(3) |
| b, Å | 4.205(1) | 4.206(2) | 4.080(1) |
| c, Å | 18.461(4) | 21.387(5) | 21.278(4) |
| $\beta$, deg | 90.49(2) | 109.65(2) | 109.31(1) |
| Z; V, Å$^3$ | 4; 1357.8(5) | 4; 1486(2) | 4; 1414.4(5) |
| D$_{calc}$, g/cm$^{-3}$ | 6.791 | 6.661 | 6.191 |
| temp, K. | 298 | 298 | 133 |
| $\lambda$(Mo K$\alpha$), Å | 0.71073 | 0.71073 | 0.71073 |
| $\mu$(Mo K$\alpha$)/cm$^{-1}$ | 692.79 | 673.54 | 304.38 |
| scan mode | $\theta$–2$\theta$ | $\theta$–2$\theta$ | $\theta$–2$\theta$ |
| 2$\theta_{max}$, deg | 50.0 | 45.0 | 50.0 |
| total data measd | 4906 | 2356 | 4898 |
| total unique data | 3570 | 2270 | 2447 |
| data with I > 3$\sigma$(I) | 1191 | 1202 | 762 |
| no. of variables | 139 | 148 | 162 |
| final R$^a$/R$_w$, $^b$ % | 6.7/5.7 | 6.3/8.3 | 5.1/3.6 |
| goodness of fit | 2.6 | 2.6 | 1.9 |

$^a R = \Sigma ||F_o| - |F_c||/\Sigma |F_o|$.
$^b R_w = \{\Sigma \omega(|F_o| - |F_c|)^2/\Sigma \omega |F_o|^2\}^{1/2}$.

Synthesis, Thermal Analysis, and Spectroscopy

In comparison with $K_2Bi_8S_{13}$, which is prepared only by direct combination of $Bi_2S_3$ and $K_2S$ at 750° C., the synthesis of the isomorphous phase $\beta$-$K_2Bi_8Se_{13}$ can be accomplished both by a direct combination reaction at 600° C. and by a flux reaction of Bi and $K_2$Se/Se at 600° C. followed by isolation in DMF. The $\alpha$-$K_2Bi_8Se_{13}$ can be obtained by a relatively wide range of molar ratio of Bi and $K_2$Se/Se between 330 and 370° C. (McCarthy, T. J., et al., Chem. Mater. 5: 331–340 (1993)). Our investigation in the K/Bi/Se system under $K_2Se_x$ flux conditions suggests that $\alpha$-$K_2Bi_8Se_{13}$ and $\beta$-$K_2Bi_8Se_{13}$ are stable phases within a limited temperature window of stability but with a relatively wide range of flux composition. The $\alpha$-form, which only forms in a flux, is surely the kinetically stabilized phase, while $\beta$-$K_2Bi_8Se_{13}$ is the thermodynamically more stable phase.

The first heating step at 530° C. employed in synthesizing $K_{2.5}Bi_{8.5}Se_{14}$ leads to a mixture of microcrystalline $K_{2.5}Bi_{8.5}Se_{14}$ and a black powder. Recrystallization at 750° C. drives this mixture to pure $K_{2.5}Bi_{8.5}Se_{14}$ A long period of thermal exposure of $K_{2.5}Bi_{8.5}Se_{14}$ to over 750° C., however, converts it to $\beta$-$K_2Bi_8Se_{13}$ with a loss of $K_2$Se, suggesting that $K_{2.5}Bi_{8.5}Se_{14}$ is a kinetically stable phase. During the preparation of pressed pellets of $K_{2.5}Bi_{8.5}Se_{14}$ for conductivity measurements, we found a new phase forming during annealing under vacuum at 600° C. This phase grows as extremely thin silvery needles on the surface of the pellet and shows a new XRD pattern. SEM/EDS analysis was performed on several crystals of this new phase to give the average ratio of $K_{1.0}Bi_{5.0}Se_{9.0}$. The remaining material in the pellet is a new phase and has a plate morphology with a very strong XRD peak at 12.59Å. SEM/EDS analysis on crystals of this phase gives an approximate composition of $K_{1.0}Bi_{3.35}Se_{6.33}$. These results suggest that the solid-state chemistry of $K_{2.5}Bi_{8.5}Se_{14}$ is very complex and warrants continued investigation.

In the synthesis of $K_{2.5}Sb_{8.5}Se_{14}$ as well, both temperature and basicity of the flux are critical. The compound can be prepared in pure form only by the molar ratio (1:2:4–6) of $K_2Se/Sb/Se$ below 530° C. A reaction of the same ratio of $K_2Se/Sb/Se$ at 600° C. gives mixture of $K_{2.5}Sb_{8.5}Se_{14}$ (yield 20%) and $K_2Sb_8Se_{13}$ (yield 80%) which is isostructural with $\beta$-$K_2Bi_8Se_{13}$. At higher temperature (>600° C.) $K_2Sb_8Se_{13}$ and an unidentified K/Sb/Se ternary compound become more stable depending on the basicity of the flux. This indicates that phase equilibria exist among these three compounds. Pure $K_2Sb_8Se_{13}$ was obtained by stoichiometric reaction of $K_2Se/Sb/Se$ at 530° C. DTA measurements showed $\beta$-$K_2Bi_8Se_{13}$, $K_{2.5}Bi_{8.5}Se_{I4}$, $K_2Sb_8Se_{13}$ and $K_{2.5}Sb_{8.5}Se_{14}$ melt at 672, 692, 466 and 488° C., respectively.

Structural Description $\beta$-$K_2Bi_8Se_{13}$. This compound is isostructural with the corresponding sulfide $K_2Bi_8S_{13}$ which is different from that of $\alpha$-$K_2Bi_8Se_{13}$. These two structure types represent an example where similar building blocks combine to give compounds with the same stoichiometry but different architecture. $\alpha$-$K_2Bi_8Se_{13}$ consists of $Bi_2Te_3$—, $CdI_2$—, and $Sb_2Se_3$-type rod fragments. $\beta$-$K_2Bi_8Se_{13}$ possesses a three-dimensional structure made up of $Bi_2Te_3$—, NaCl—, and $CdI_2$-type infinite rod-shaped blocks. These different types of fragments are common in other bismuth chalcogenides such as $Cs_3Bi_7Se_{12}$[7] and $KBi_{6.33}S_{10}$ (Kanatzidis, M. G., et al., Chem. mater. 8: 1465–1474 (1996); Kanatzidis, M. G., et al., Mater. Res. Soc. Symp. Proc. 410: 37–43 (1996); Chung, D.-Y., et al., Mat. Res. Soc. Symp. Proc. 478: 333–344 (1997)). The $CdI_2$-type and $Bi_2Te_3$-type rods in $\beta$-$K_2Bi_8Se_{13}$ are arranged side by side to form layers perpendicular to the c-axis. The NaCl-type rod fragments connect the layers to build a 3-D framework with tunnels filled with $K^+$ cations. The width of the $Bi_2Te_3$ and the NaCl rods in this structure is three Bi polyhedra, while the width of the $CdI_2$-type rod is only two Bi polyhedra. The dimensions of these building blocks define the structural characteristics of each structure type in these materials (also see structure of $K_{2.5}M_{8.5}Se_{14}$ (M=Bi, Sb) below). overall, the structure of $\beta$-$K_2Bi_8Se_{13}$ is slightly more dense than that of the $\alpha$-form, because in the latter 25% of the Bi atoms are found in a trigonal-pyramidal geometry, while in the former all Bi atoms are in an octahedral or higher coordination geometry (see FIG. 1). The origin of the structural and property differences (see below) between these two forms lies partly to the ability of the $6s^2$ lone pair of $Bi^{3+}$ to stereochemically express itself.

Interestingly, the structure of $\beta$-$K_2Bi_8Se_{13}$ is closely related to that of $Sr_4Bi_6Se_{13}$[9] by replacing two $Sr^{2+}$ atoms with two $K^+$ atoms and the remaining two $Sr^{2+}$ atoms with two $Bi^{3+}$ atoms. These substitutions are isoelectronic on average and do not require compositional changes in the "$Bi_6Se_{13}$" part of the compound. Therefore an alternative way of representing this phase is $(K,Bi)_2Bi_6Se_{13}$.

Among the $K^+$ cations in $\beta$-$K_2Bi_8Se_{13}$, K(2) is fully occupied by $K^+$ while the others, K(1) and K(3), are disordered with Bi(9) and Bi(8), respectively. Those high-coordinate disordered Bi atoms and $CdI_2$-type channels serve to stitch the fragments together. The Bi(8) site contains 62% Bi and 38% K while the K(1) site contains 62% K and 38% Bi. The same kind of disorder is found in the isostructural sulfide $K_2Bi_8S_{13}$, with the only difference being that in the sulfide the Bi atoms are disordered over three sites of K (1,2,3). Bi(8) has three normal Bi—Se bonds ranging from 2.843(9) to 3.04(1) Å and five longer distances from 3.31(2) to 3.681(9) Å, resulting in a distorted bicapped trigonal prism. The coordination of the K(1) site is very similar to that of the Bi(8) site. The K(l) site also exhibits three bonds ranging from 2.85(1) to 3.07(2) Å and five longer ones ranging from 3.44(1) to 3.70(1)Å. Since $Bi^{3+}$ and $K^+$ have similar sizes, this similarity in the coordination environments of the Bi(8) and K(1) sites explains the disorder between Bi and K. On the other hand, the coordination environment of the K(2) site is different by being fully occupied. It can be described as a distorted, tricapped trigonal prism with eight Se atoms in the range between 3.28(3)–3.58(3)Å and one Se atom 3.71(3)Å away. The prism is defined by atoms Se(4), Se(9), Se(10) and their symmetry-equivalent atoms, while the capping atoms are Se(10), Se(11), and Se(12). In contrast, the K(2) site in the sulfide analogue $K_2Bi_8S_{13}$ is 20% occupied with Bi, and it is shifted away from the center of this tricapped prismatic site (the distance between K(2)-S(12) is 4.22(1) Å instead of 3.71(3)Å in the selenide, while the rest of the distances are shorter, in the range 2.72(2)–3.66(2)Å). As a result of this shift, the coordination environment of K(2) site is a bicapped trigonal prism. The K—Se distances below 3.0Å are unusual and presumably a result of averaging over the mixed K/Bi sites.

Bi(4) and Bi(6) possess regular octahedral coordination with Bi—Se bond distances shorter than 3.2Å which lies well within a single covalent Bi—Se bond. Bi(1), Bi(2), Bi(3), Bi(5), and Bi(7) have a distorted octahedral coordination where a short bond is trans to a long bond while the angles remain close to those of a normal octahedron. For example, the Bi(7)-Se(4) bond distance of 2.74(1)Å is trans to a long Bi(7)-Se(13) distance at 3.36(1)Å This type of coordination environment is very prevalent in bismuth chalcogenide chemistry and results from the influence of the non-bonded, stereochemically active $6s^2$ electron pair (Kanatzidis, M. G., et al., Chem. mater. 8: 1465–1474 (1996); Kanatzidis, M. G., et al., Mater. Res. Soc. Symp. Proc. 410: 37–43 (1996); Chung, D.-Y., et al., Mat. Res. Soc. Symp. Proc. 478: 333–344 (1997)).

$K_{2.5}Bi_{8.5}Se_{14}$

This compound possesses a complex 3-D anionic framework which is very similar to that of $\beta$-$K_2Bi_8Se_{13}$. Compositionally, $K_{2.5}Bi_{8.5}Se_{14}$ derives from $\beta$-$K_2Bi_8Se_{13}$ by addition of 0.5 equiv of $KBiSe_2$. The main difference between the two structures is that in $K_{2.5}Bi_{8.5}Se_{14}$ only NaCl— and $Bi_2Te_3$-type blocks exist. The latter form by addition of half "$BiSe_2$" atoms to $CdI_2$-type fragment in $\beta$-$K_2Bi_8Se_{13}$. In other words, the addition of "$BiSe_2$" in the $CdI_2$-type blocks of $\beta$-$K_2Bi_8Se_{13}$ generates $Bi_2Te_3$-type blocks which are five-bismuth atoms wide. This small structural modification ingeniously preserves the same connectivity of the NaCl-type fragments and the same size and shape of the K(2) site as in $\beta$-$K_2Bi_8Se_{13}$. Although the width of the NaCl block in the structure of $K_{2.5}Bi_{8.5}Se_{14}$ is also three Bi polyhedra, the width of its $Bi_2Te_3$ block is five Bi polyhedra which is an important difference with the structure of $\beta$-$K_2Bi_8Se_{13}$ (see FIG. 2).

Atom K(2) in $K_{2.5}Bi_{8.5}Se_{14}$ is fully occupied while K(1) and K(3) are disordered with Bi(5) and Bi(7) at a ratio of 80/20 and 70/30, respectively. K(1) and Bi(5) are located at the same site, which has bicapped trigonal prismatic coordination by Se (2), Se (3), Se (3) ', Se(8), and Se(8)' with distances ranging from 3.48(2) to 3.75(1)Å and by Se(7), Se(7)', and Se(11) from 2.83(1) to 3.17(2)Å (the atoms primed outside parentheses are the symmetrically equivalent ones). K(3) and Bi(7) are positionally disordered at the distance of 0.54Å from each other and K(3) is also surrounded by a bicapped trigonal prism of Se atoms with distances of 3.16(3)–3.61(1)Å. Bi(7) has three short distances (2.78(1)–3.09(2)Å) and five long ones (3.48(1)–3.84(2)Å), the latter being less than the sum (4.23Å) of van der Waals radii of Bi and Se.

A characteristic feature in the K—Bi—Q material is that whenever high coordination sites are found in the lattice (i.e.,>6) K/Bi disorder is encountered. This is attributed to the similar ionic sizes of $K^+$ and $Bi^{3+}$ in high coordination. In octahedral lattice sites, $K^+/Bi^{3+}$ disorder is less common.

Charge-Transport Properties

Figure 3:
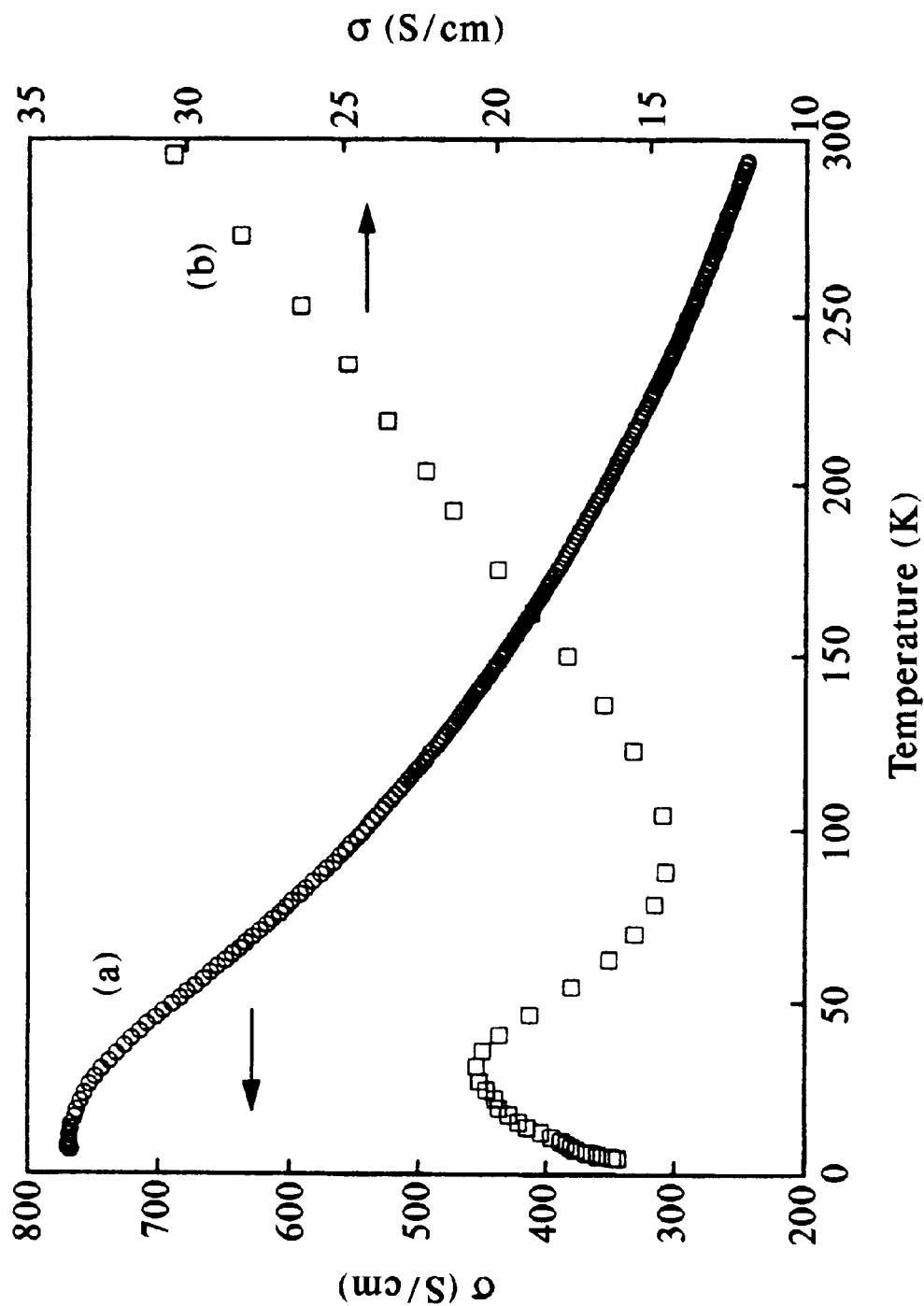
FIG. 3 shows variable-temperature electrical conductivity data for (a) a single crystal and (b) a polycrystalline ingot of $\beta$-$K_2Bi_8Se_{13}$.

The electrical properties of $\beta$-$K_2Bi_8Se_{13}$ and $K_{2.5}Bi_{8.5}Se_{14}$ were measured from single-crystal samples and polycrystalline ingots. There is typically a variation of conductivity among crystals of the same compound which may be due to a number of factors including errors associated with measuring the cross-sectional areas of the needle-like crystals. The highest room-temperature conductivity value obtained for single crystals of $\beta$-$K_2Bi_8Se_{13}$ was 250 S/cm with a weak negative temperature dependence consistent with a semimetal or a narrow-bandgap semiconducting material (see FIG. 3). There is a striking difference in conductivity when comparing to $\alpha$-$K_2Bi_8Se_{13}$ which shows a room temperature value of 2 S/cm. This is presumably due to the substantial structural differences between the $\alpha$- and $\beta$-forms. Polycrystalline compactions of these materials show similar trends where at room temperature the $\alpha$-$K_2Bi_8Se_{13}$ has a conductivity of 0.01 S/cm while $\beta$-$K_2Bi_8Se_{13}$ and $K_{2.5}Bi_{8.5}Se_{14}$ show ~30 and ~150 S/cm, respectively. This enormous difference is attributed to the fact that $\beta$-$K_2Bi_8Se_{13}$ and $K_{2.5}Bi_{8.5}Se14$ have more dense three-dimensional structures than does $\alpha$-$K_2Bi_8Se_{13}$. The Bi—Se bonding is more extensive in the first two compounds, and this gives rise to greater orbital overlap in the Bi—Se network, broader valence and conduction bands, and consequently lower bandgap. Between $\beta$-$K_2Bi_8Se_{13}$ and $K_2Bbi_8S_{13}$ the selenide has a higher electrical conductivity as would be expected.

The nature of the charge carriers in these materials was probed with thermoelectric power measurements as a function of temperature. Seebeck coefficient is obtained from the voltage difference across a sample placed in a thermal gradient. It should be noted that such measurements involve no current and are not susceptible to sample morphology (i.e., single crystal vs polycrystalline pellet) and thus probe the inherent properties of the compounds. This is in contrast to the electrical conductivity data which can be dramatically influenced by the existence of grain boundaries.

Figure 4:
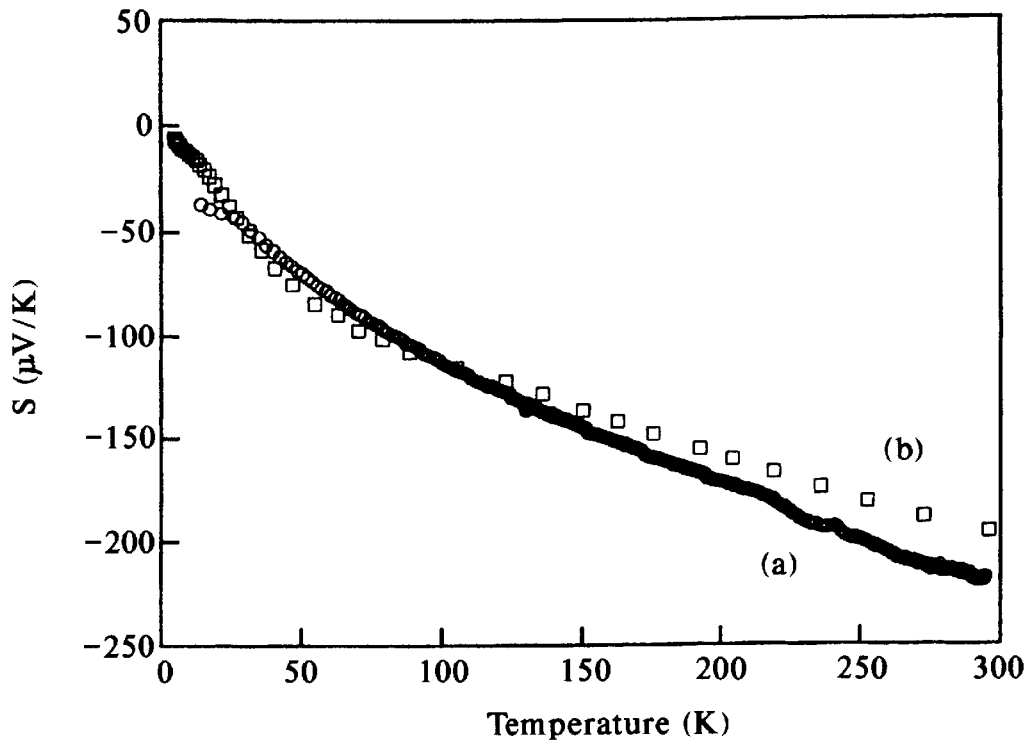
FIG. 4 shows variable-temperature thermoelectric power data for (a) a single crystal and (b) a polycrystalline ingot of $\beta K_2Bi_8Se_{13}$.
Figure 5:
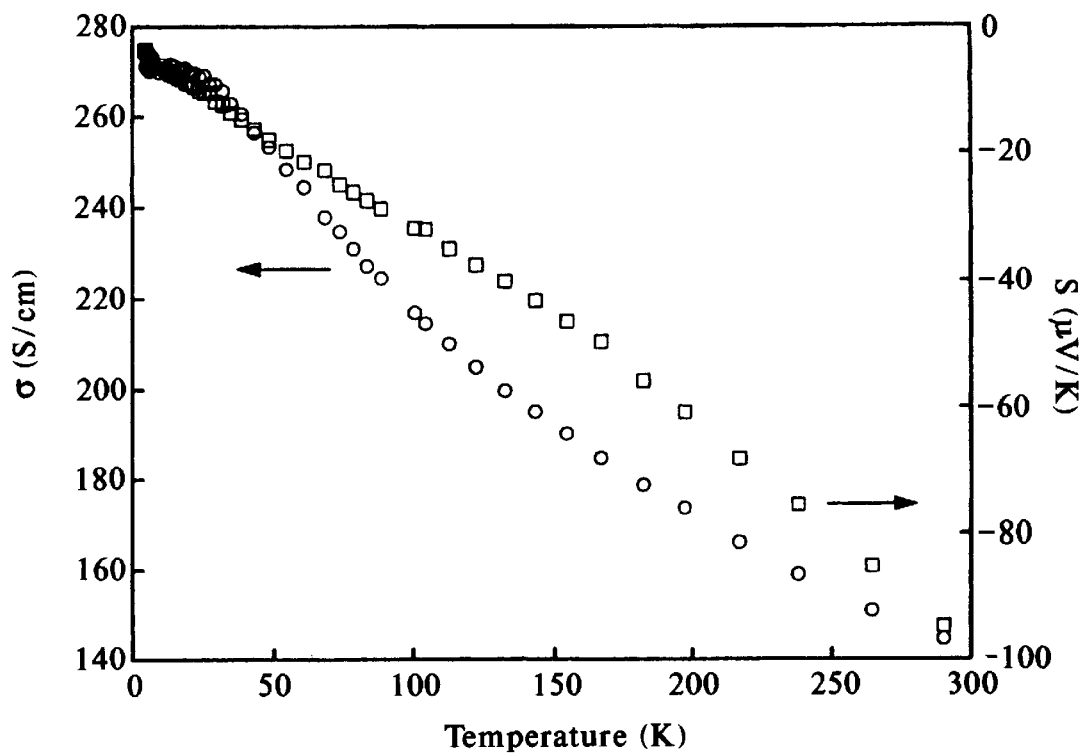
FIG. 5 shows variable-temperature electrical conductivity and thermoelectric power data for a polycrystalline ingot of $K_{2.5}Bi_{8.5}Se_{14}$.

The thermopower data for $\beta$-$K_2Bi_8Se_{13}$ and $K_{2.5}Bi_{8.5}Se_{14}$ show very large negative Seebeck coefficients (−200 and −100 $\mu V/K$ at room temperature, respectively; see FIGS. 4 and 5), which indicate the charge carrier are electrons (n-type). It is remarkable that the thermopower behavior and magnitude of the $\beta$-$K_2Bi_8Se_{13}$ is similar to that of its a-analogue despite the large differences in conductivity. The thermopower values in these materials become less negative as the temperature is decreased from 300 to 4 K, reminiscent of a metallic behavior, but the very large Seebeck coefficients are more consistent with semiconductors.

Energy Bandgaps

Despite the metal=like temperature dependence of the electrical conductivity and thermopower of $\beta$-$K_2Bi_8Se_{13}$ and $K_{2.5}Bi_{8.5}Se_{14}$, the valence precise character indicated by their structure and formulation suggests they should be semiconductors. Indeed, diffuse reflectance spectroscopy on $\beta$-$K_2Bi_8Se_{13}$ and $K_{2.5}Bi_{8.5}Se_{14}$ at room temperature revealed the presence of well defined electronic transitions associated with a bandgap of 0.59 and 0.56 eV, respectively.

Figure 6A:
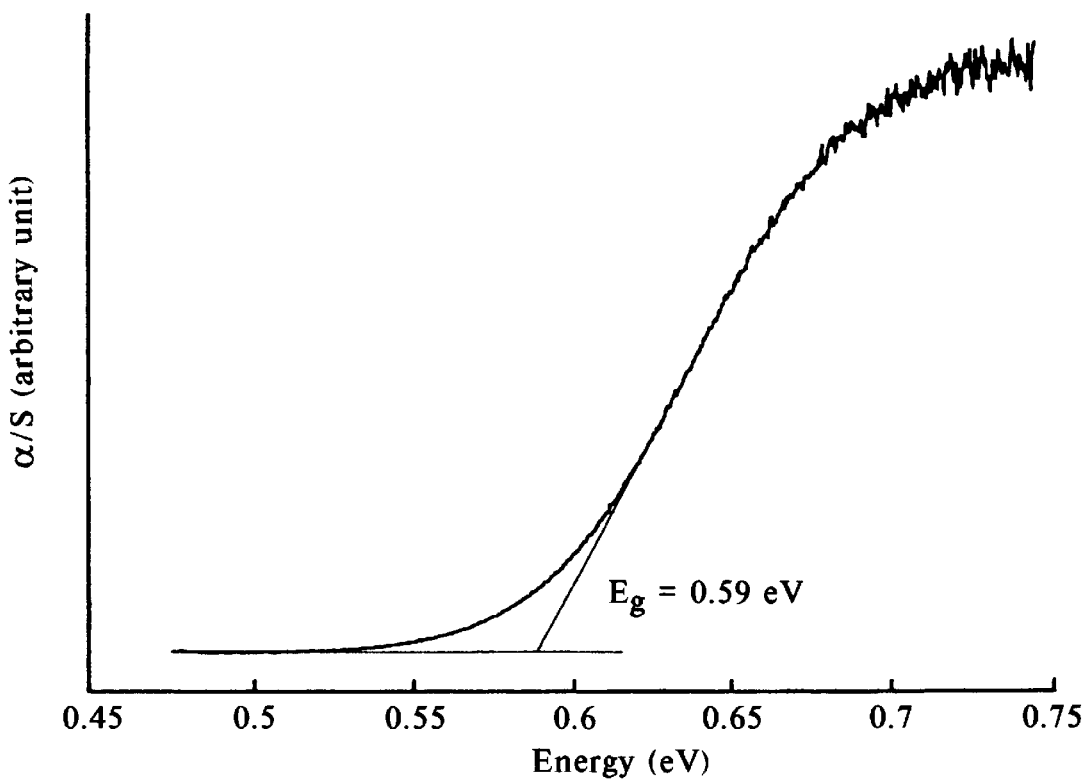
Figure 6B:
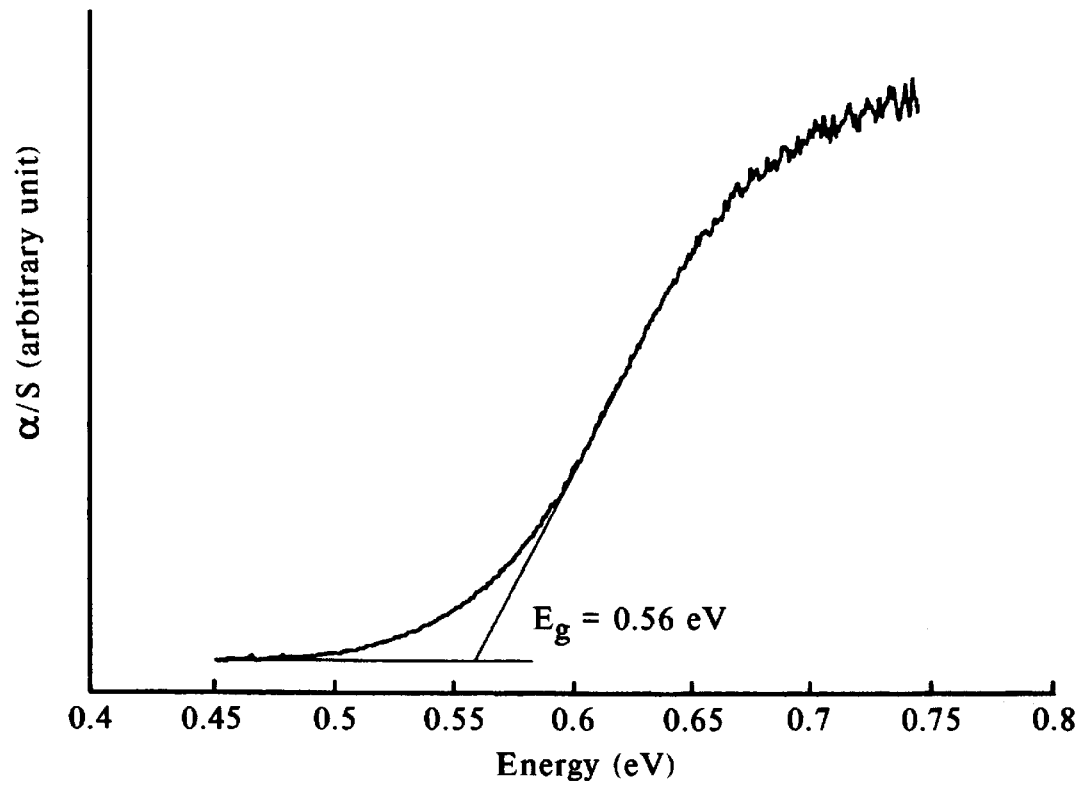
Figure 6C:
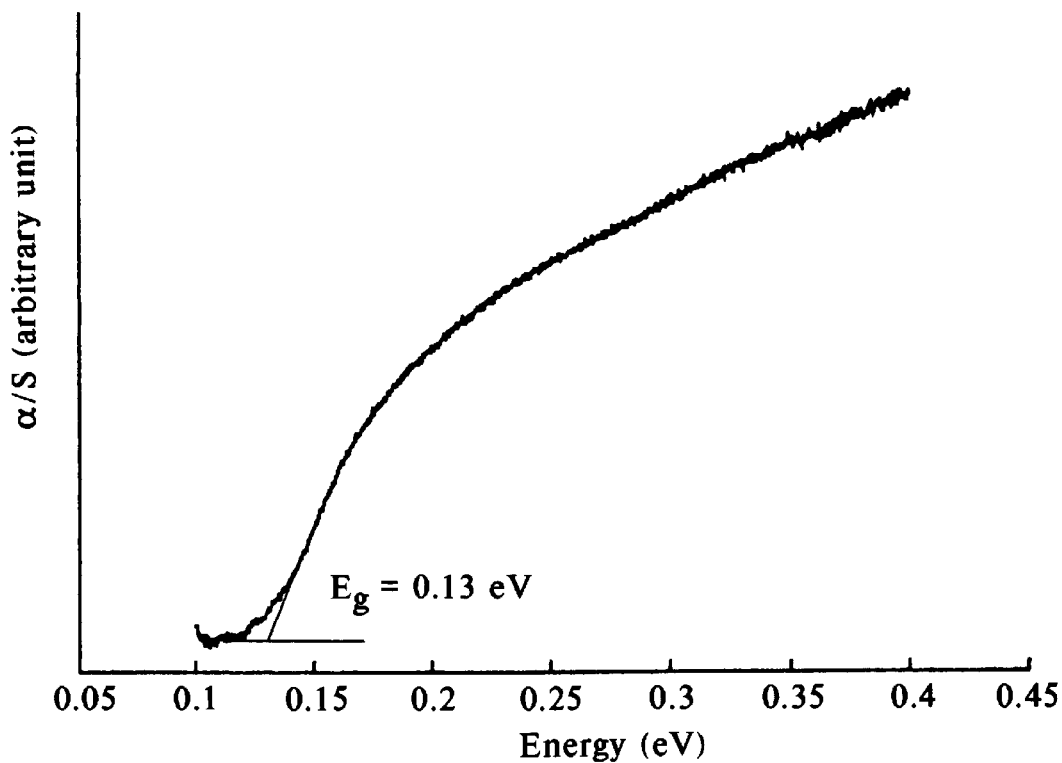
Figure 6D:
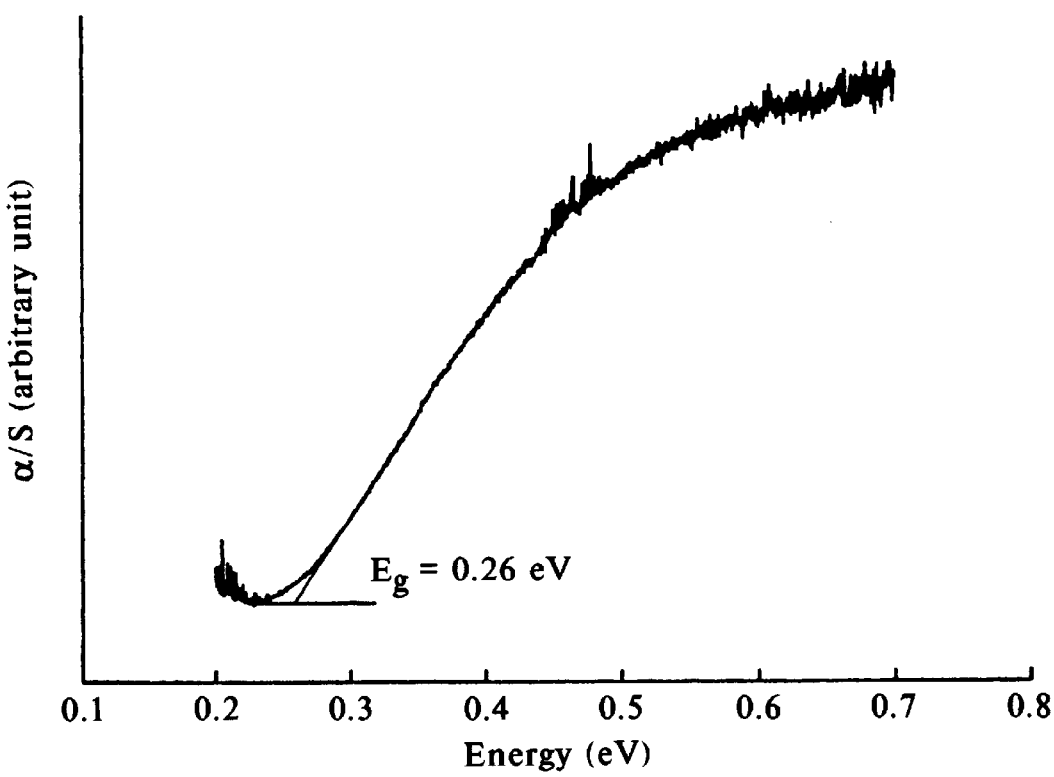
Figure 7A:
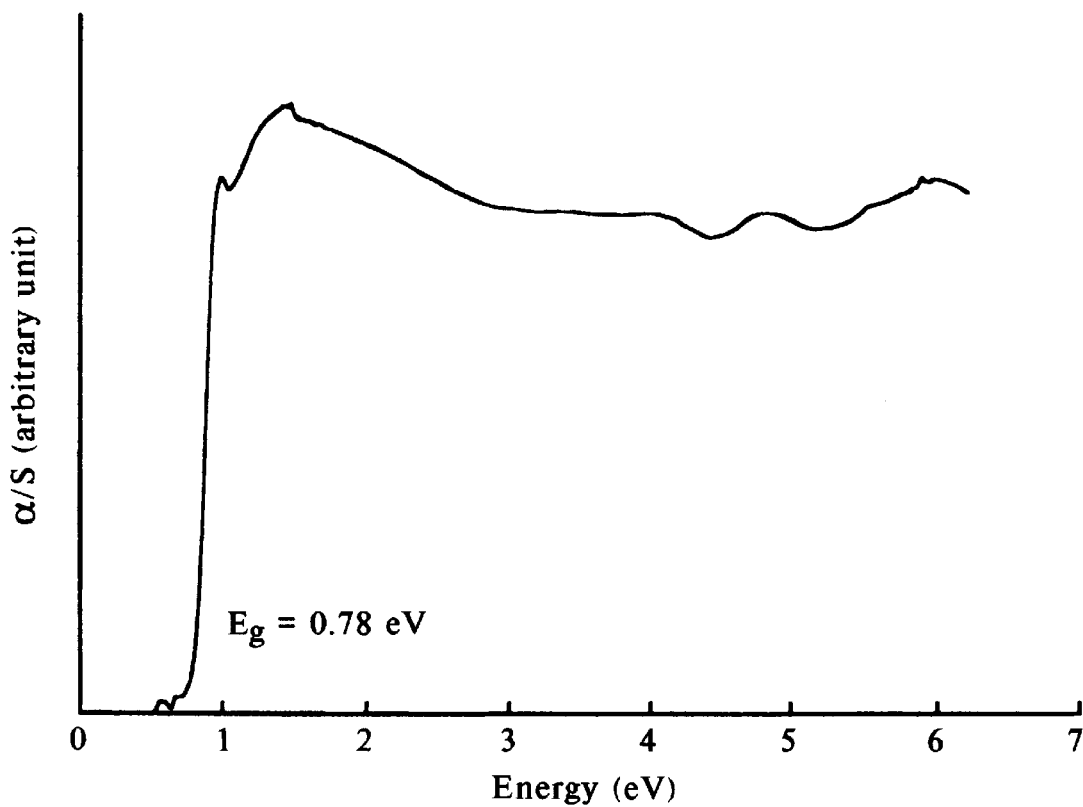
FIG. 7A shows solid-state UV/vis spectra of $K_2Sb_8Se_{13}$ and in FIG. 7B of $K_{2.5}Sb_{8.5}Se_{14}$.
Figure 7B:
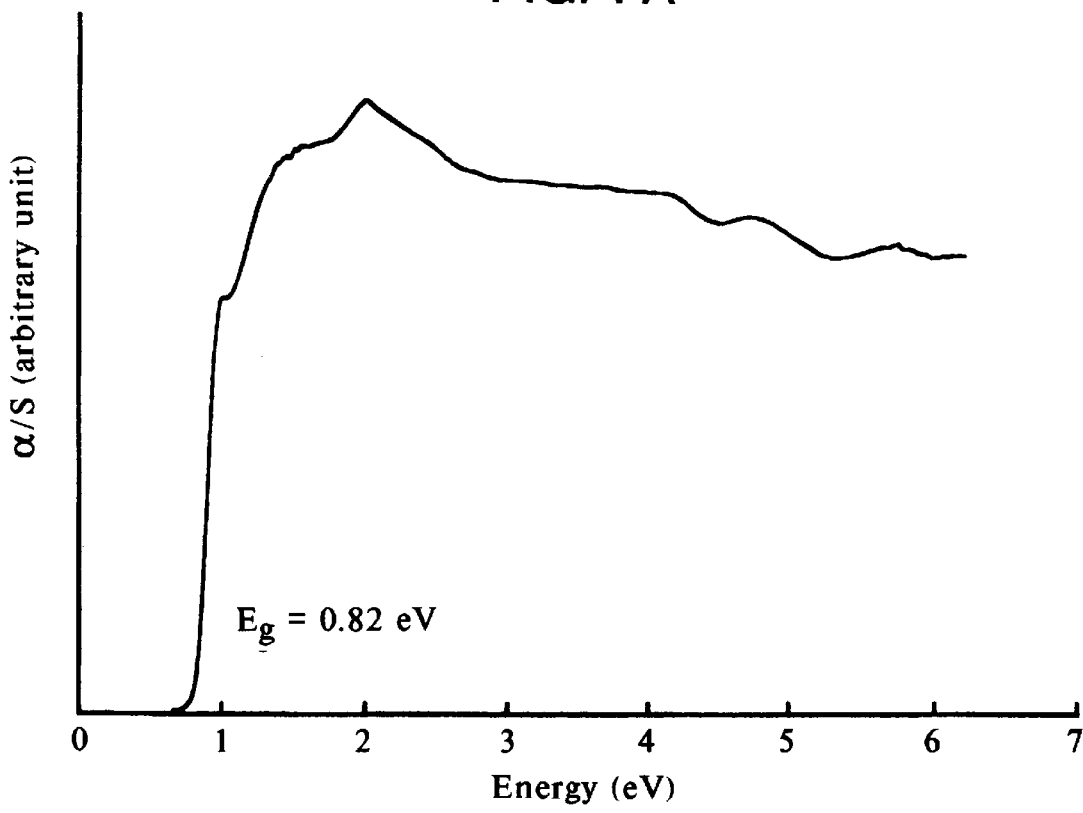
Figure 8:
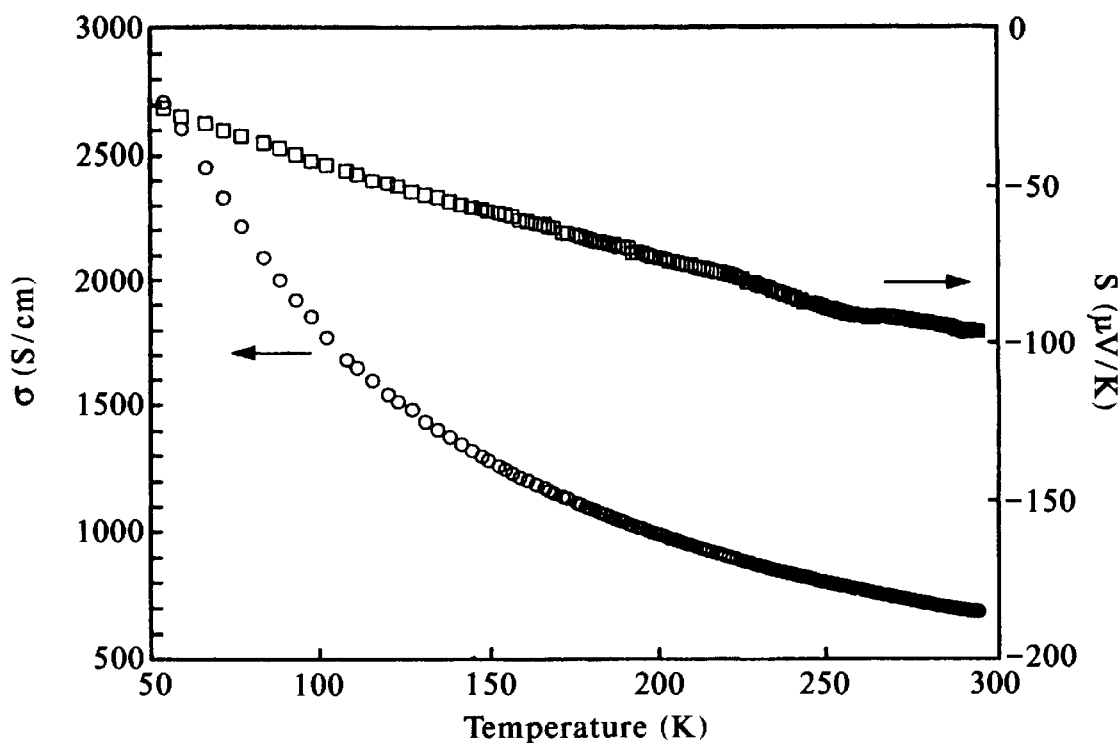
FIG. 8 shows variable-temperature electrical conductivity and thermopower data for vacuum annealed single-crystal specimens of $\beta$-$K_2Bi_8Se_{13}$.

Diffuse reflectance spectroscopy, in the infrared region, is well suited for the determination of bandgaps in narrow-gap semiconductors, as can be shown by measuring the well-known gaps of $Bi_2Te_3$ and $Bi_2Se_3$, see FIG. 6c, 6d (Smith, R. A., Semiconductors, 2nd ed.; Cambridge University Press; New York (1978); and The reported bandgaps of $Bi_2Se_3$ are 0.13 and 0.27 eV, respectively. CRC Handbook of Chemistry and Physics. 7th ed.; Lide, D. R., Ed.; CRC Press: Boca Raton, Fla., pp 12–62 (1990)). At this stage an assessment of the nature of these energy gaps (i.e., direct vs indirect) cannot be made, but the origin of these electronic transitions is thought to be similar to that in $Bi_2Se_3$, which involves charge transfer from Se p-orbitals to low-lying empty $Bi^{3+}$ orbitals. By comparison, the less dense structure of $\alpha$-$K_2Bi_8Se13$, which has a slightly more open framework, has a wider gap of 0.76 eV and consequently lower electrical conductivity.

Annealing Studies

Figure 9:
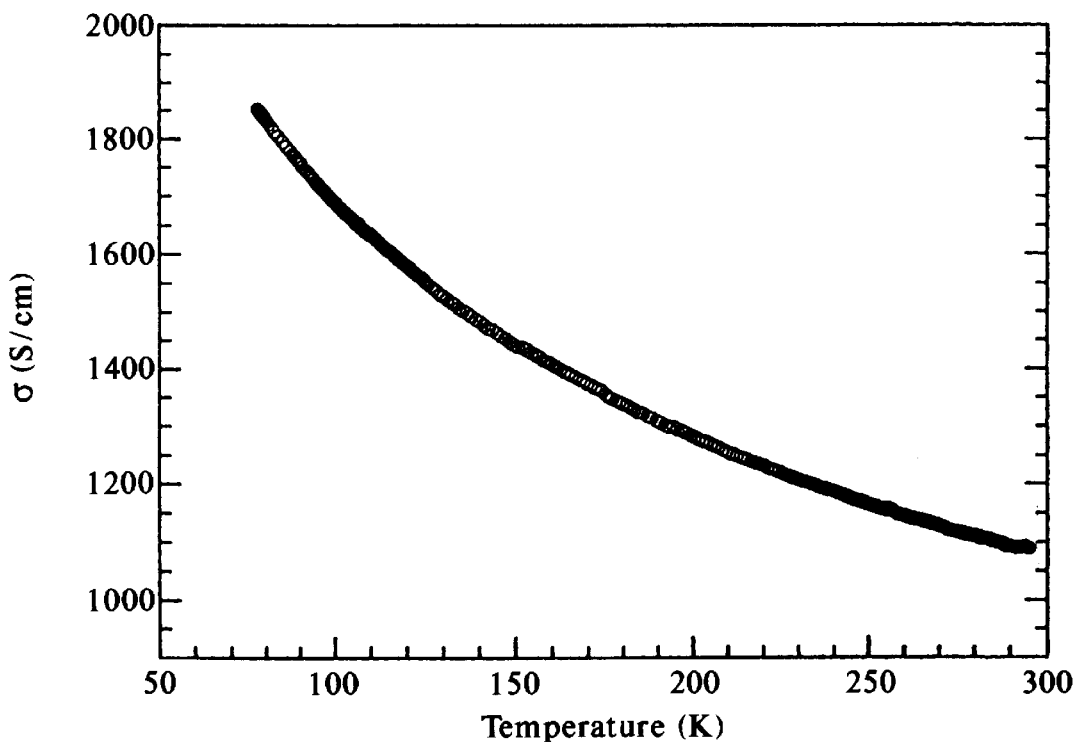
FIG. 9 shows variable-temperature electrical conductivity for vacuum annealed single-crystal specimen of $K_{2.5}Bi_{8.5}Se_{14}$.

The metal-like behavior of the charge-transport properties of $\beta$-$K_2Bi_8Se_{13}$ and $K_{2.5}Bi_{8.6}Se_{14}$ are, therefore, due to heavy doping occurring during synthesis to the point where these materials can be classified as degenerate semiconductors. Such doping could be brought about via slight nonstoichiometry between K/Bi, slight Se deficiency or slight Se excess. The negative thermopower of the materials indicates electrons as the carriers and is consistent with slight Se deficiency. To change the electrical properties of these materials, we carried out annealing experiments under vacuum below the melting point for 36 h, because we expected that this would create additional Se vacancies in the lattice. We found that annealing $\beta$-$K_2Bi_8Se_{13}$ in this manner causes the electrical conductivity to rise substantially from ~250 to 670 S/cm at room temperature (see FIG. 9). The metal-like slope to the data as a function of temperature is enhanced. AT the same time the thermopower decreases from −200 to −100 $\mu V/K$ (see FIG. 9). The negative sign of the thermopower after annealing indicates that the carrier type has not changed. The decrease in magnitude, however, together with the substantial increase in electrical conductivity indicates the number of n-type carriers in the material has increased. This could happen through the creation of Se vacancies in the lattice which results in electron injection into the materials conduction band (each Se atom generates two electrons).

Single crystals of $K_{2.5}Bi_{8.5}Se_{14}$ were obtained in a reaction of K/Bi/Se at 600° C. as a minor phase which was separated from the major phase $\beta$-$KBiSe_2$ and annealed for 3.5 days. These conditions are highly conducive to producing Se-deficient samples in the same way as for $\beta$-$K_2Bi_8Se_{13}$ above. In fact, thus far we were able to produce single crystals of $K_{2.5}Bi_{8.5}Se_{14}$ suitable for electrical measurements only under such conditions. The single-crystal electrical measurement reveal a highly conductive material with a room temperature value of 1100 S/cm and a strong metal-like temperature dependence (see FIG. 9). Unfortunately, these crystals are so highly doped that they display an extremely small thermopower at room temperature of −6 $\mu V/K$ a values typical of metallic materials.

Thermal Conductivity

Figure 10:
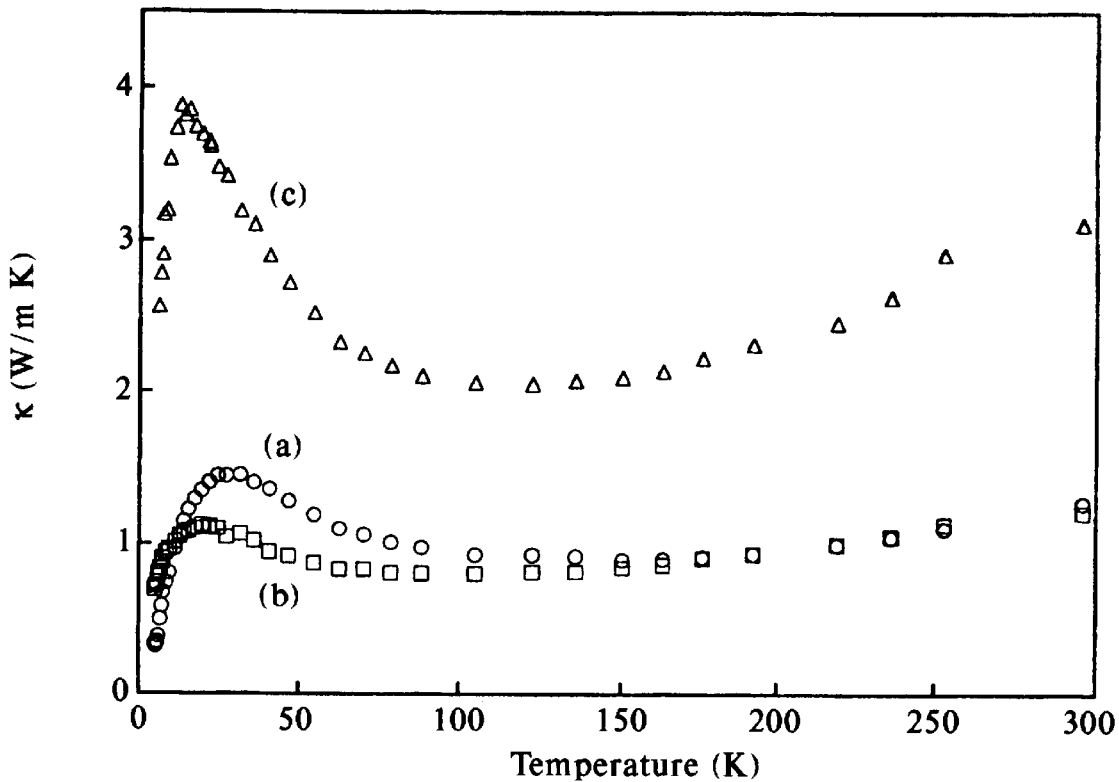
FIG. 10 shows variable-temperature thermal conductivity data for polycrystalline ingot samples of (a) $\beta$-$K_2Bi_8Se_{13}$, (b) $K_{2.5}Bi_{8.5}Se_{14}$, and (c) $K_2Bi_8S_{13}$.

The thermal conductivity of a material ($\kappa_T$) is the sum of the electronic thermal conductivity ($\kappa_e$), due to the electrical carriers (electrons or hole), and the lattice thermal conductivity ($\kappa_l$), which is due to the atomic lattice vibrations (phonons). To properly evaluate the potential of $\beta$-$K_2Bi_8Se_{13}$ and $K_{2.5}Bi_{8.5}Se_{14}$ for thermoelectric applications, we measured the thermal transport properties of $\beta$-$K_2Bi_8Se_{13}$ and $K_{2.5}Bi_{8.5}Se_{14}$ over a wide temperature range (see FIG. 10).

The room-temperature thermal conductivities of $\beta$-$K_2Bi_8Se_{13}$ and $K_{2.5}Bi_{8.5}Se_{14}$ are comparable (1.28 and 1.21 W/m·K, respectively) and similar to that of optimized $Bi_2Te_3$ alloy ($\kappa_l$~1.3 W/m·K) (Encyclopedia of Materials Science and Engineering, Thermoelectric Semiconductors; MIT Press; Cambridge, Mass.; Pergamon Press: Oxford, p. 4968 (1986)). This, and work reported earlier, (Kanatzidis, M. G., et al., Chem. mater. 8: 1465–1474 (1996); Kanatzidis, M. G., et al., Mater. Res. Soc. Symp. Proc. 410: 37–43 (1996); Chung, D.-Y., et al., Mat. Res. Soc. Symp. Proc. 478: 333–344 (1997)) demonstrate that it is possible to achieve lower thermal conductivity in ternary compounds with complex compositions and crystal structures compared to corresponding high-symmetry binary compounds. Another reason for the very low thermal conductivities of these compounds may be the presence of alkali atoms in tunnels which are only electrostatically interacting with Se atoms on the tunnel walls. This means that these atoms are loosely bound and the fact that the thermal parameters of the K atoms are the largest in the unit cell of both compounds corroborates this. This is in agreement with Slack's suggestion of an "electron-crystal, phonon-glass" (Slack, G. A. In CRC Handbook of Thermoelectrics; Rowe, D. M., Ed.; CRC Press: Boca Raton, Fla. pp 407–440 (1995)) being a key feature of a thermoelectric material. According to this idea loosely bound atoms with large thermal parameters scatter phonons much more strongly than electrons so that they create a glasslike thermal conductivity without affecting the electronic mobility which is associated with the covalently bound part of the structure, that is the $[Bi_xSe_y]^{n-}$ framework.

Using the measured values of the electrical resistivity in conjunction with the Wiedemann-Franz law (Kittel, C., Introduction to Solid State physics, 6th d.; John Wiley & Sons, Inc.: New York p. 150 (1986)), the maximum possible values of the $\kappa_e$ contribution in both cases were estimated to be less than 10% of $\kappa_T$. Thus, essentially all heat in $\beta$-$K_2Bi_8Se_{13}$ and $K_{2.5}Bi_{8.5}Se_{14}$ is carried by lattice phonons. The thermal conductivity of $\beta$-$K_2Bi_8Se_{13}$ in the temperature range 4–300 K is significantly lower than that of the isostructural compound $K_2Bi_8Se_{13}$, which is consistent with the fact that the heavier Se atoms soften the lattice phonons thereby suppressing heat transport in the material.

Figure 11:
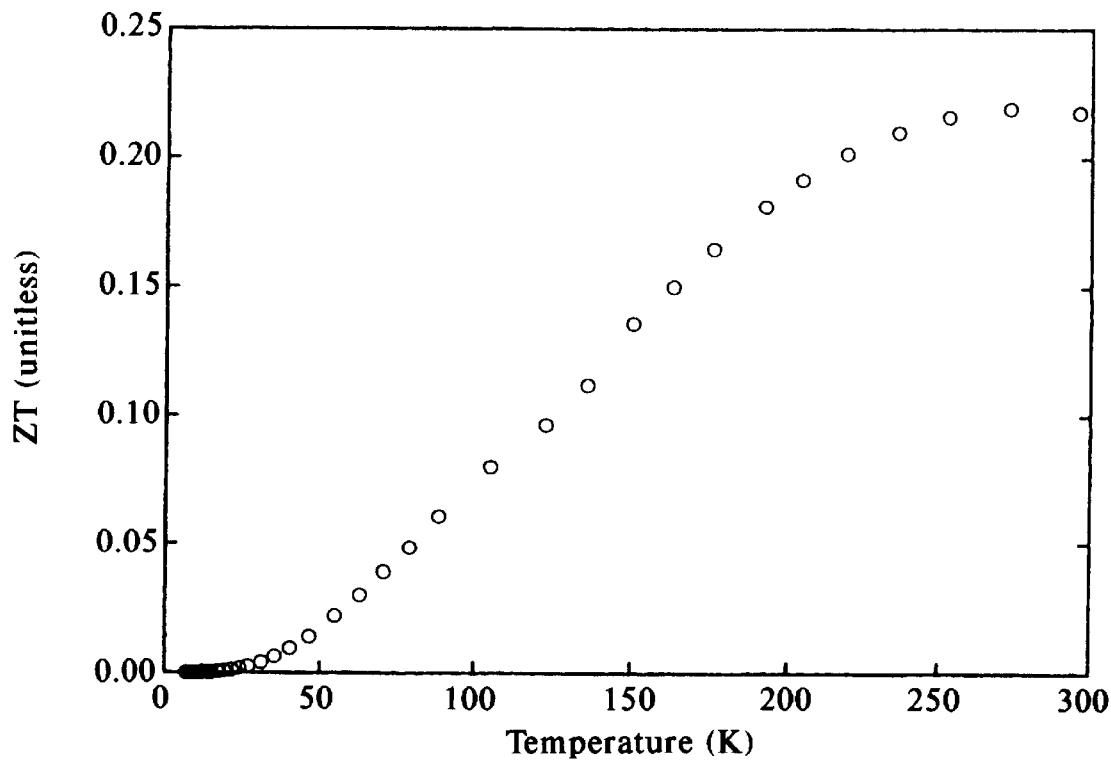
FIG. 11 shows temperature dependence of the thermoelectric figure of merit (ZT) for $\beta$-$K_2Bi_8Se_{13}$.

On the basis of the results presented above, the compound $\beta$-$K_2Bi_8Se_{13}$ and $K_{2.5}Bi_{8.5}Se_{14}$ are promising as a thermoelectric materials. The figure of merit (ZT) as a function of temperature for "as-prepared" $\beta$-$K_2Bi_8Se_{13}$ is shown in FIG. 11. The room-temperature ZT value is 0.22. By comparison optimized $Bi_2Te_3$ has a ZT of 0.87 (Scherrer, H., et al., CRC Handbook of Thermoelectrics; Rowe, D. M., Ed.; CRC Press: Boca Raton, Fla. pp 211–237 (1995)). Given that the compounds reported here have not been optimized, it may be more fair to compare the ZT of $\beta$-$K_2Bi_8Se_{13}$ with that of unoptimized i.e., as prepared) $Bi_2Te_3$ which is typically in the neighborhood of 0.55. The better performance of $Bi_2Te_3$ derives mainly from its higher electrical conductivity ($\sigma$~850 S/cm) since the thermopower of the materials reported here is comparable, while their thermal conductivity is equal or lower. A sensible approach to improve the thermoelectric figure of merit of these ternary compounds could be sulfur alloying or solid solutions of $K_xBi_y(Se,S)_z$ and $K_x(Bi, Sb)_y(Se)_z$. This type of alloying is expected to lower the $\kappa_L$ further and increase the thermopower by increasing energy bandgap.

The reactions of Bi with $K_2Se_x$ flux have revealed the new compounds, $\beta$-$K_2Bi_8Se_{13}$ and $K_{2.5}Bi_{8.5}Se_{14}$. These compounds are isostructural with $K_2Bi_8S_{13}$ (Kanatzidis, M. G., et al., Chem. Mater. 8: 1465–1474 (1996); Kanatzidis, M. G., et al., Mater. Res. Soc. Symp. Proc. 410: 37–43 (1996); Chung, D.-Y., et al., Mat. Res. Soc. Symp. Proc. 478: 333–344 (1997)) while the latter has a different structure type. The A/M/Q (A-alkali metal; M=Bi; Q=S, Se, Te) system has been found to have a very rich chemistry with compositional and structural varieties of $(A_2Q)_n(M_2Q_3)_m$. As prepared, $\beta$-$K_2Bi_8Se_{13}$ and $K_{2.5}Bi_{8.5}Se_{14}$ are n-type semiconductors with narrow bandgaps of 0.59 and 0.56 eV, respectively, and they possess promising properties for thermoelectric applications. It is noteworthy that $\beta$-$K_2Bi_8Se_{13}$ exhibits higher electrical conductivity and lower thermal conductivity (1.28 W/m·K), without any loss of thermoelectric power (~200 $\mu$V/K), relative to its isostructural analogue $K_2Bi_8S_{13}$ and its allotropic kin $\alpha$-$K_2Bi_8Se_{13}$. This work shows that high thermopowers and high conductivities are possible in ternary K—B—Se systems. It is also evident that low thermal conductivities in low-symmetry, large unit-cell compounds which contain loosely bound alkali atoms in tunnels are relatively easy to achieve. This suggests that the modification of composition and structure of $M_2Q_3$ by the introduction of $A_2Q_x$ is a viable approach to search for superior thermoelectric properties. The application of dopants to manipulate the electron density at the Fermi level and to control the conductivity type in these materials is now warranted to maximize ZT. Knowledge of the electronic band structure of the compounds will be useful in gaining some insight into the nature of the bands near the Fermi level.

Figure 12:
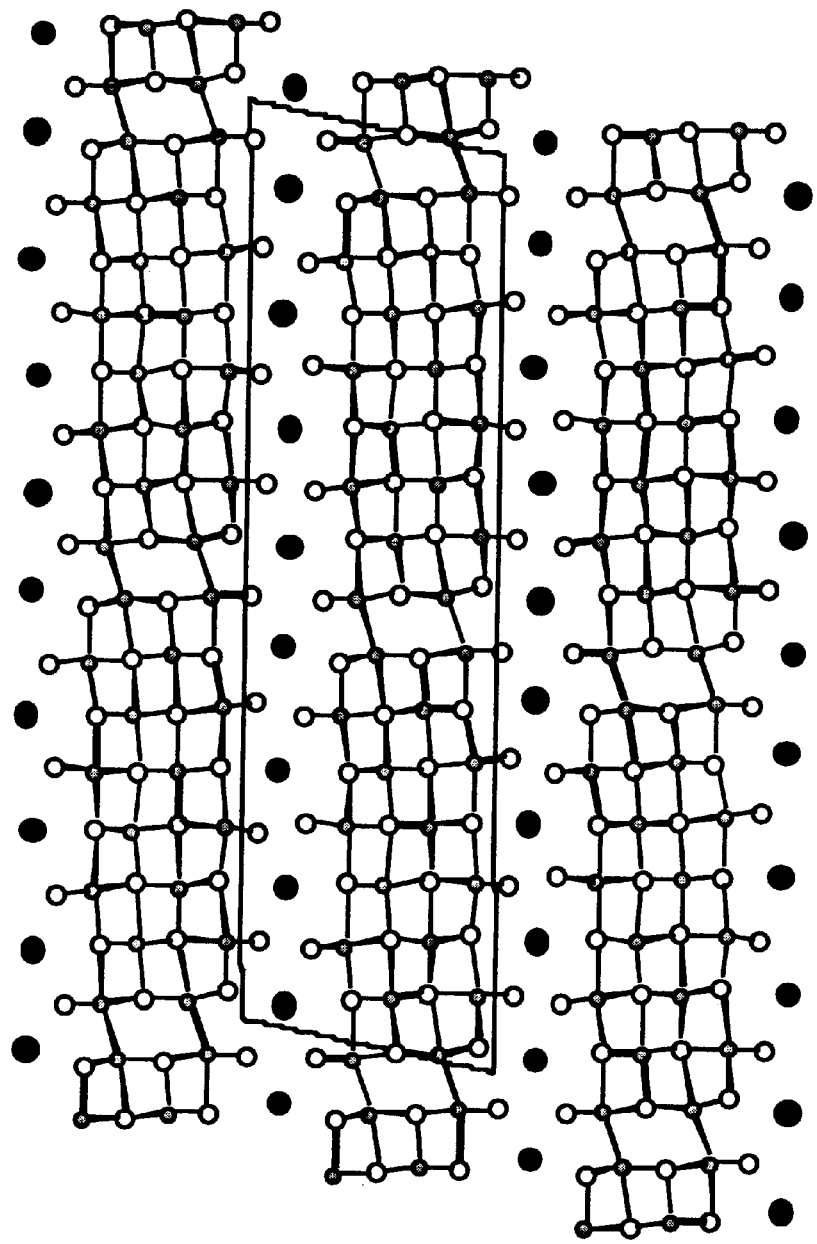
FIG. 12 is a schematic molecular representation of $CsBi_4Te_6$ (Example 6).
Figure 13:
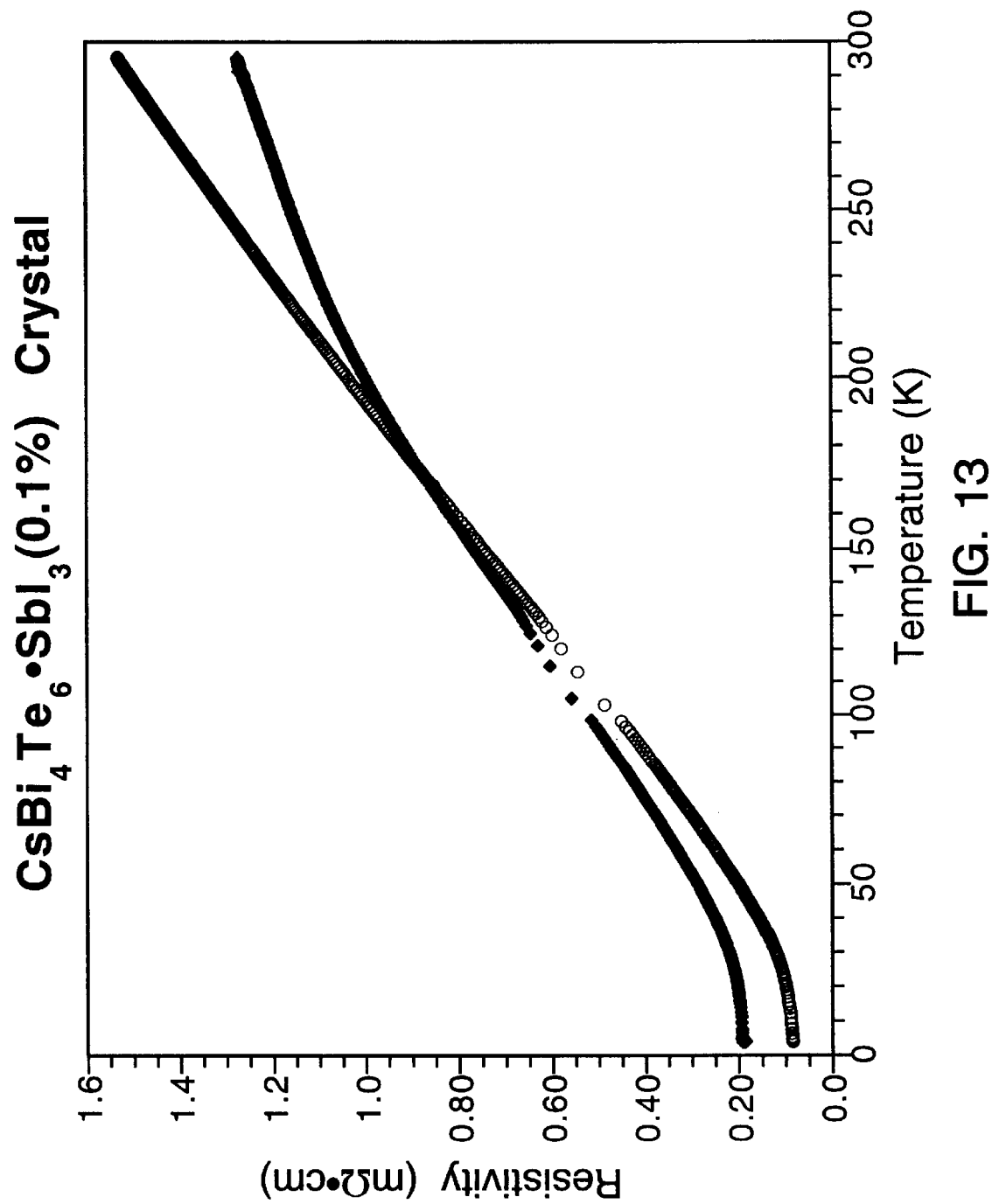
FIGS. 13, 14, 15, 16, 17, 18, 19 and 20 are graphs showing the properties of $CsBi_4Te_6.SbI_3$ (Example 3) wherein the dopant ($SbI_3$) is at various levels between 0.1 and 0.4 weight percent.
Figure 14:
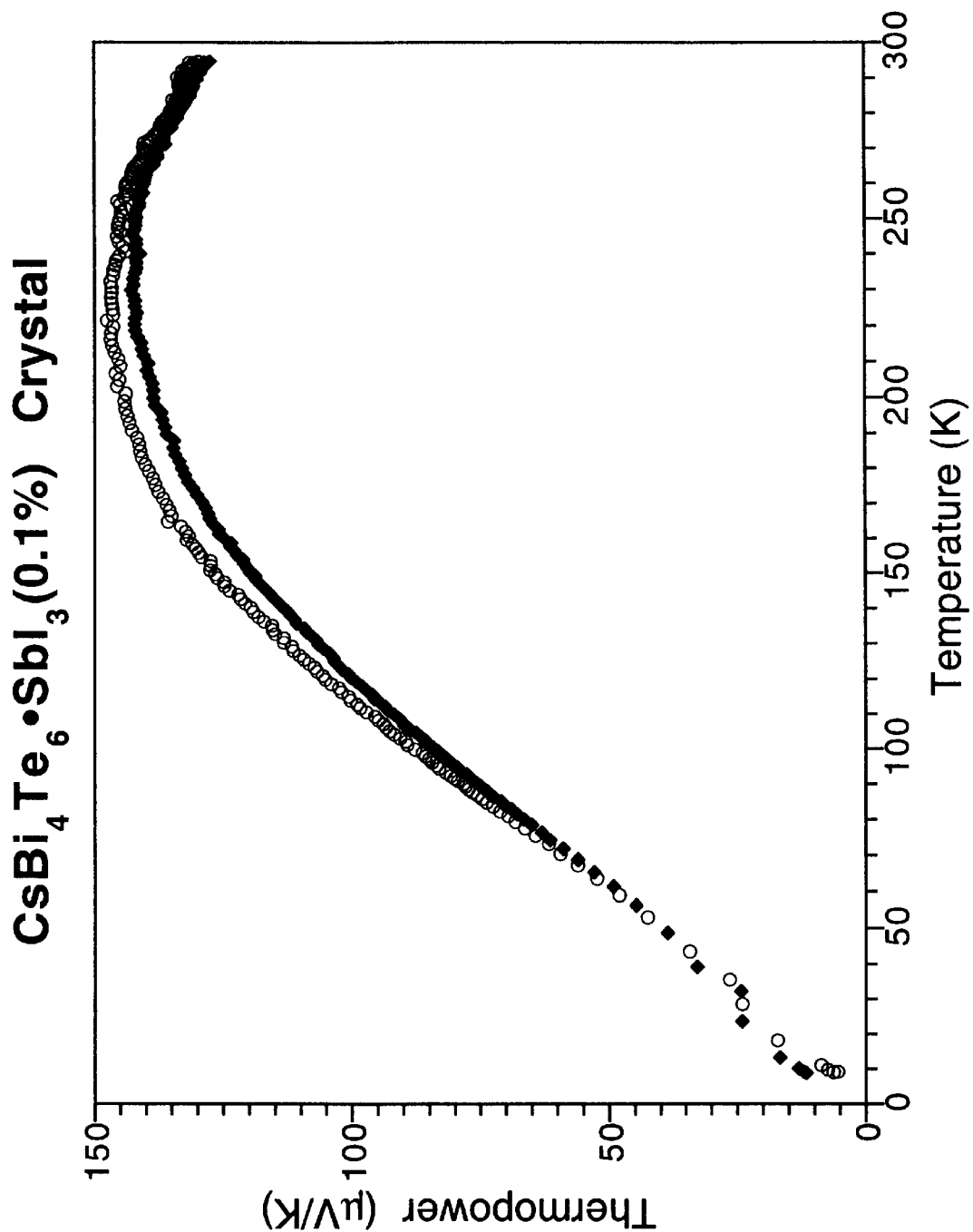
Figure 15:
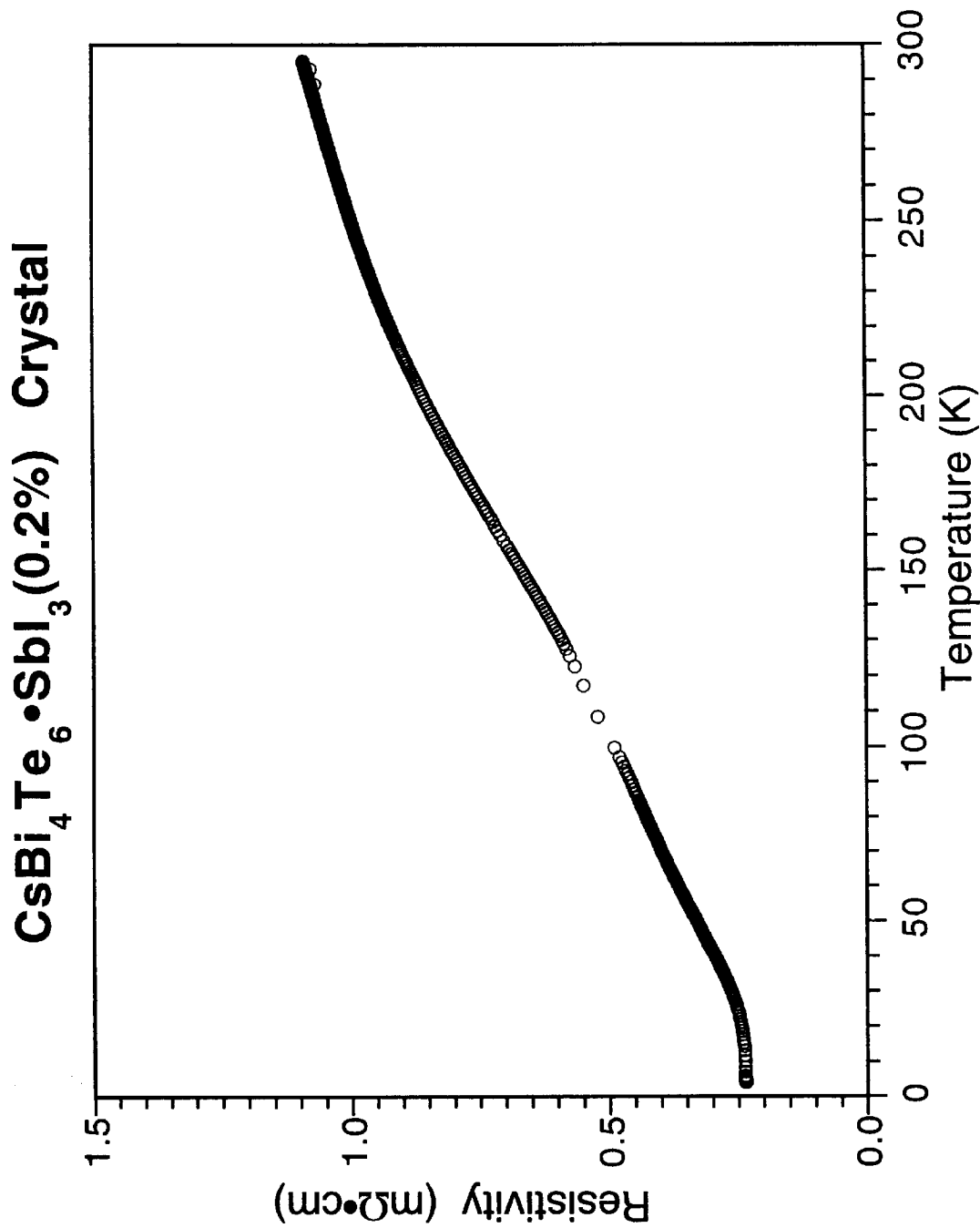
Figure 16:
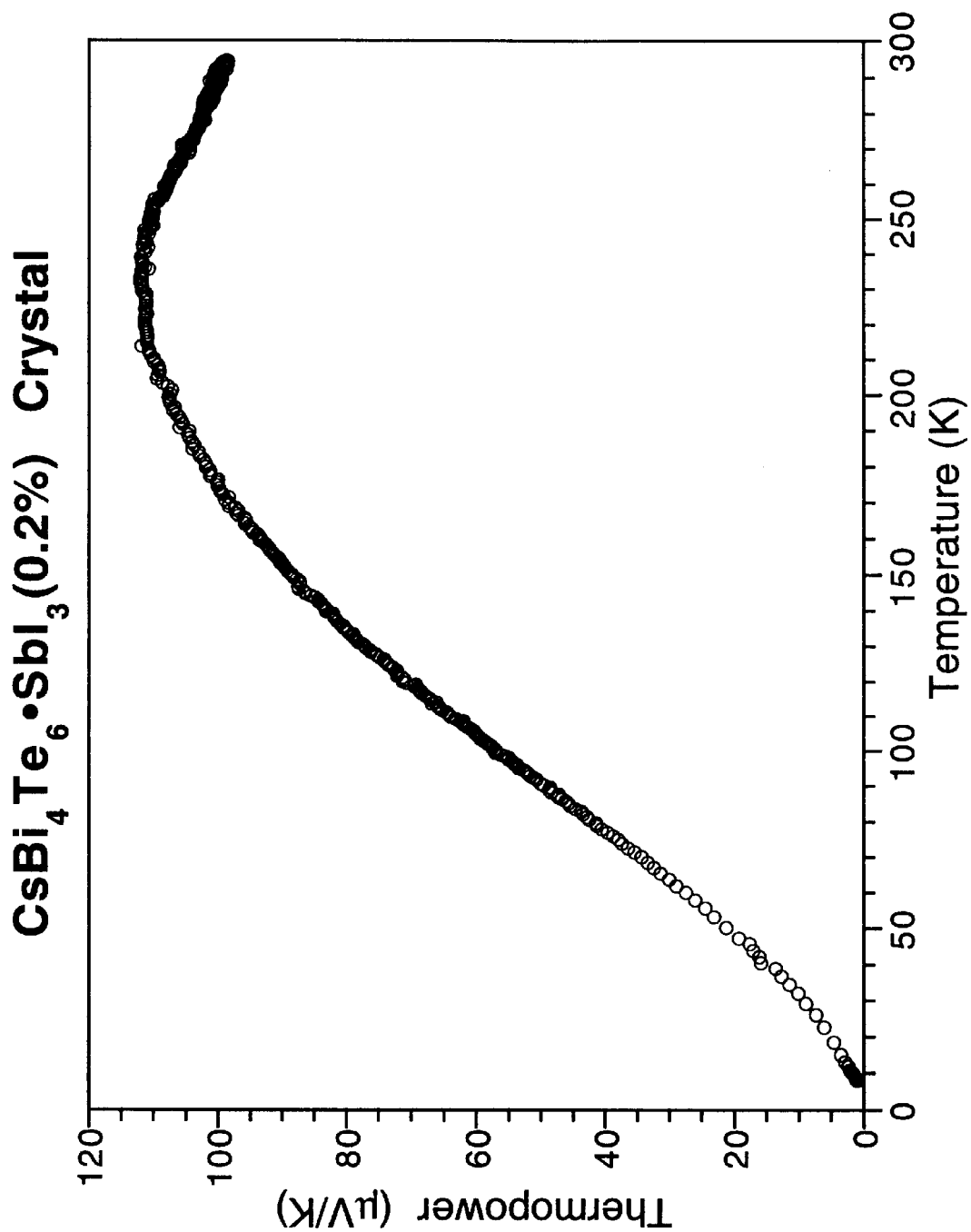
Figure 17:
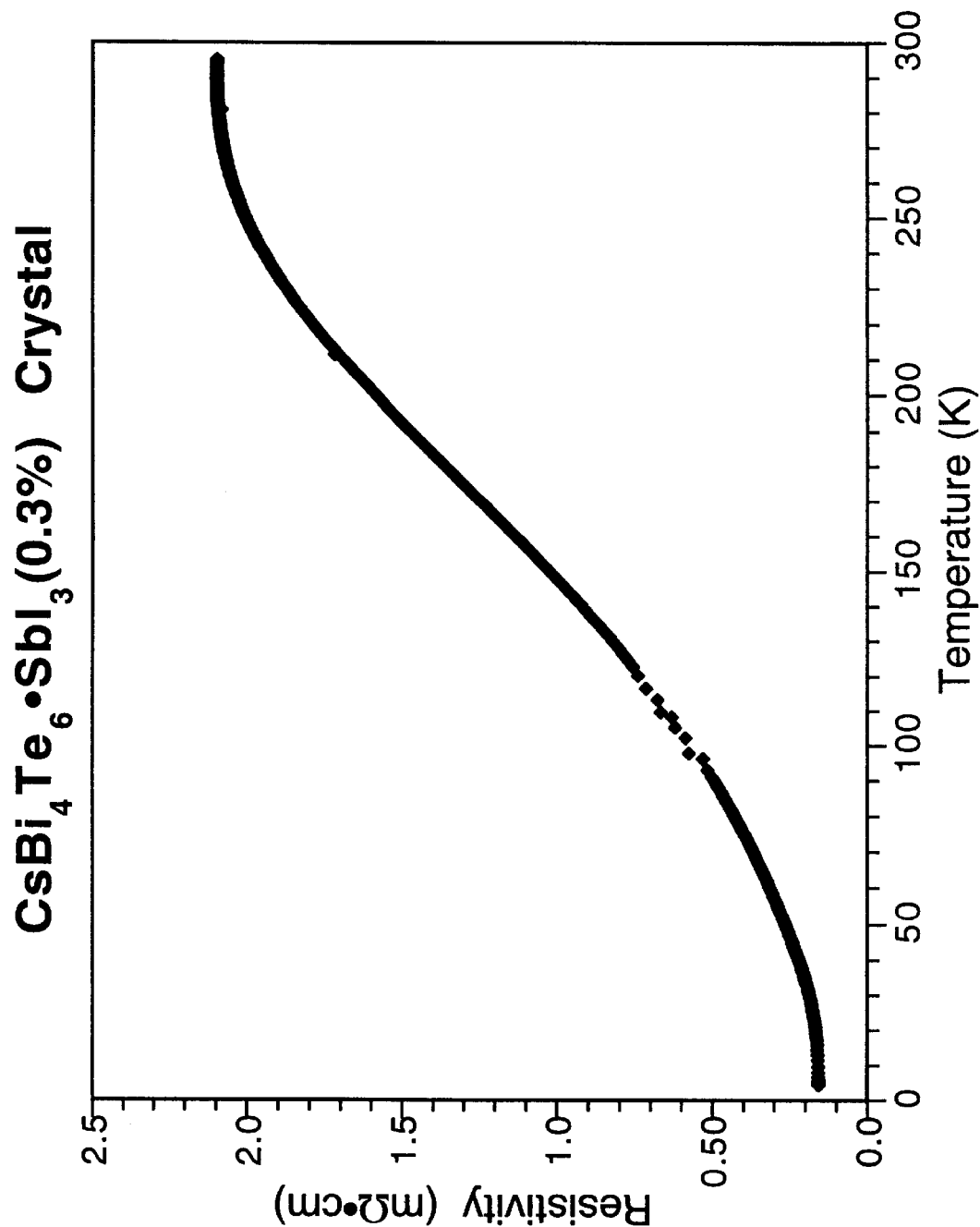
Figure 18:
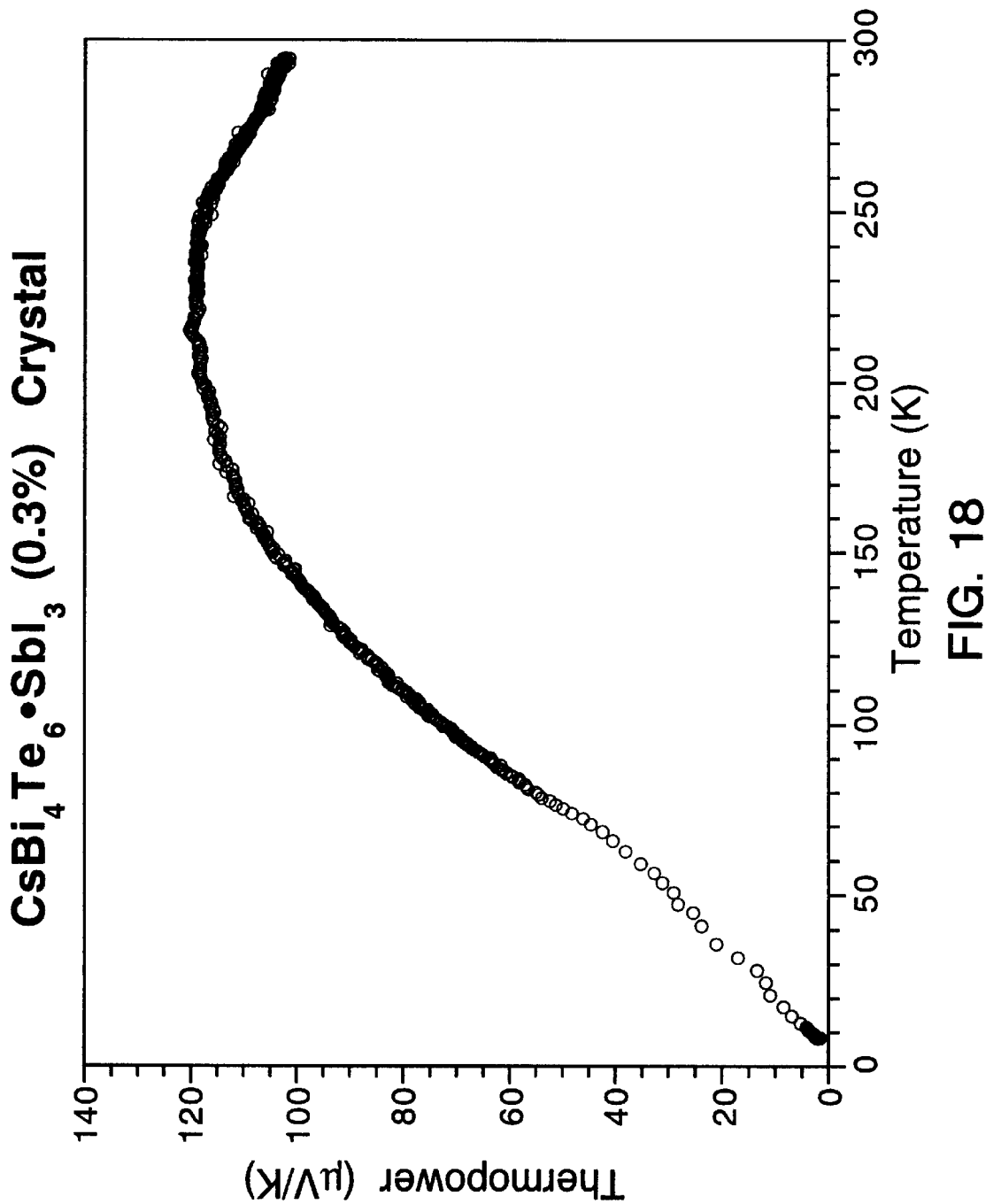
Figure 19:
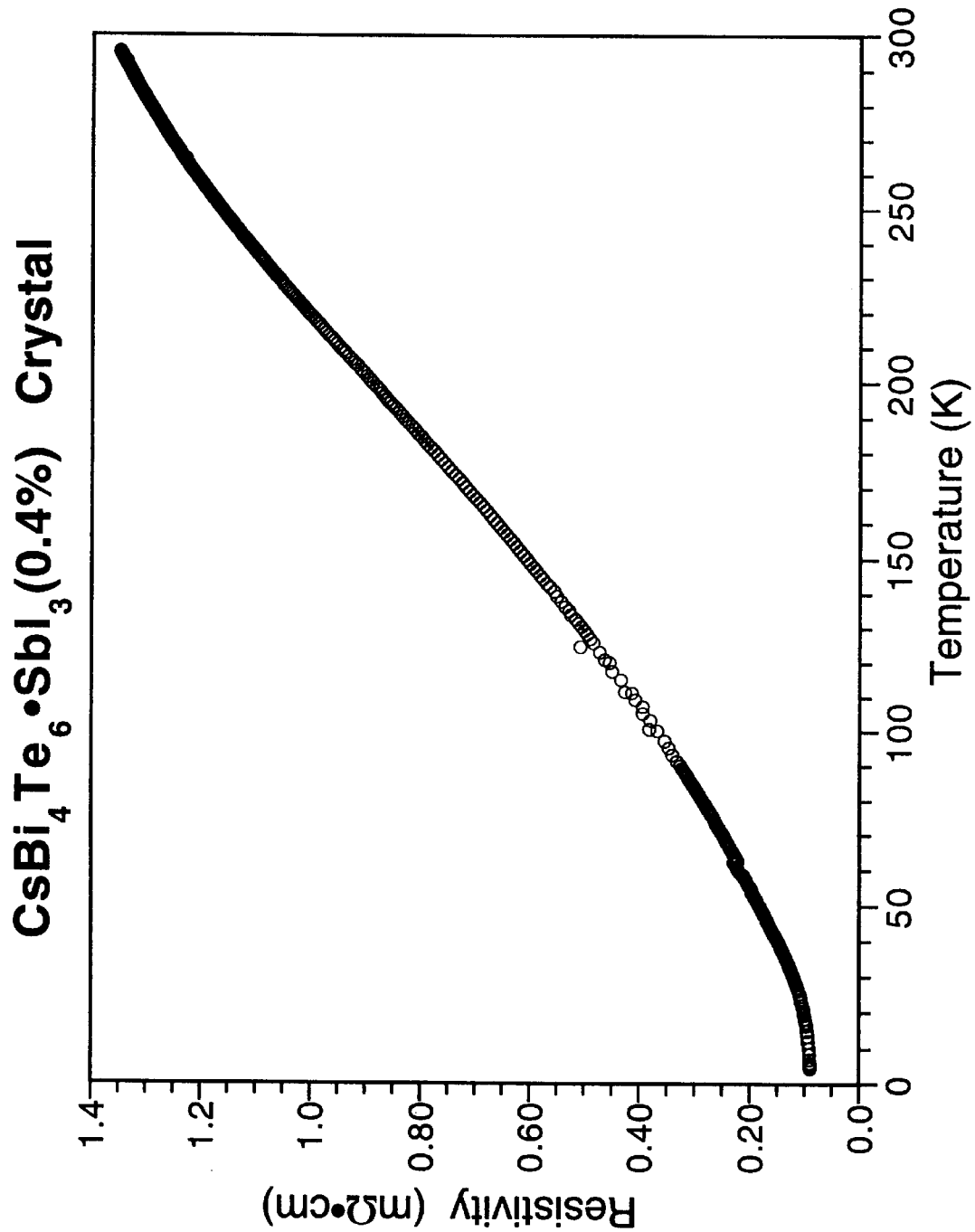
Figure 20:
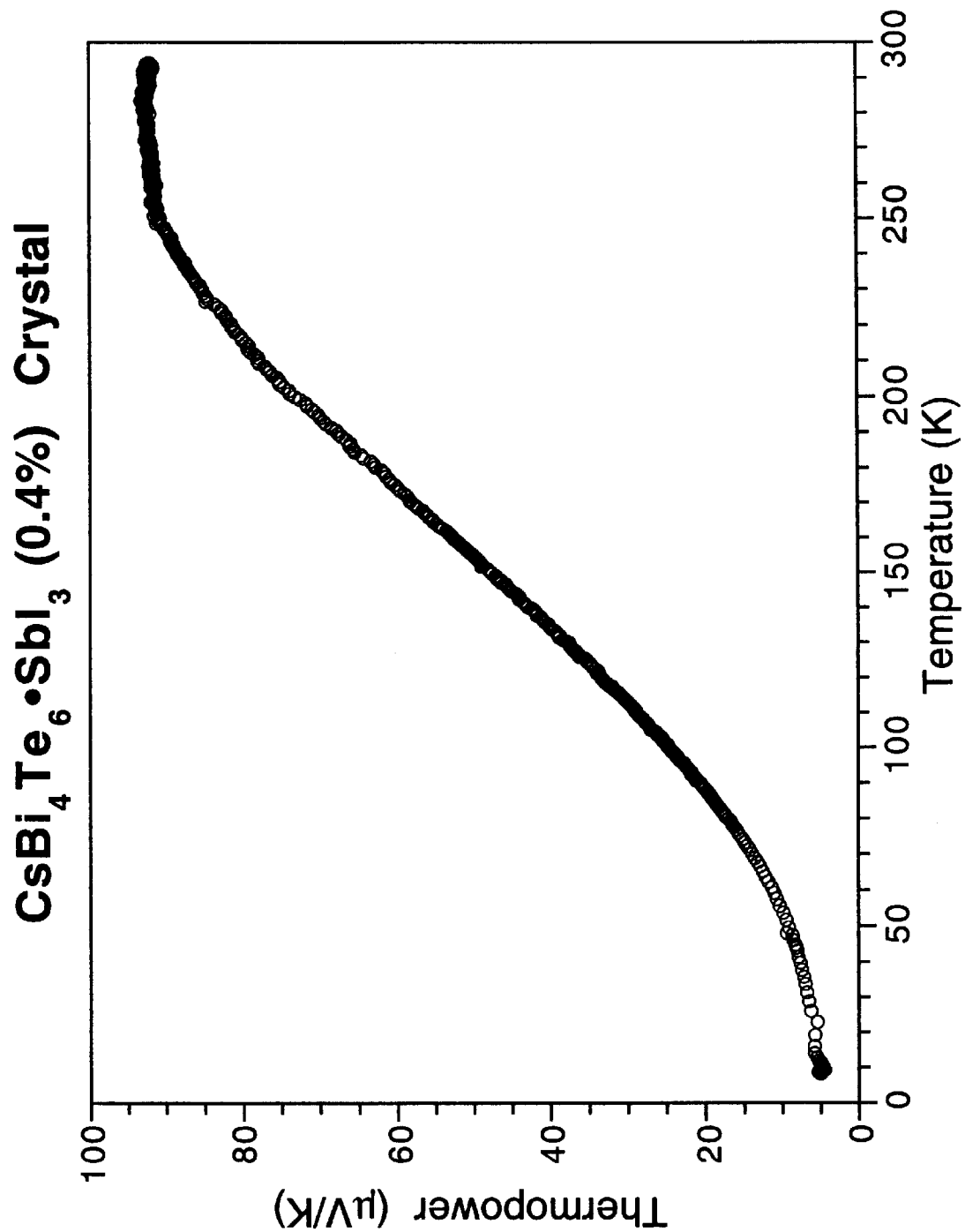
Figure 21:
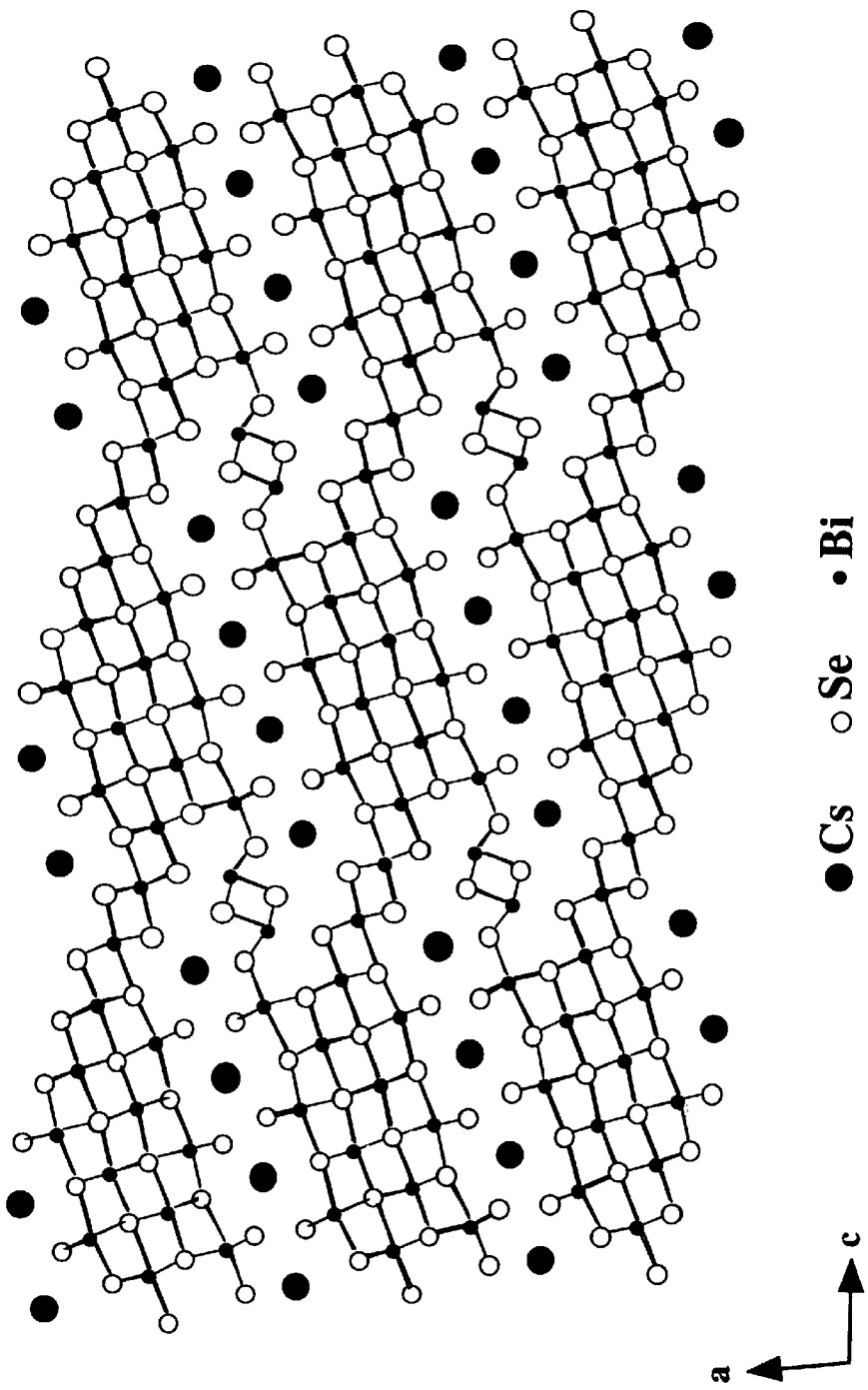
FIG. 21 is a schematic representation of the crystal structure of $A_2B_8Se_{13}$ where A is Cs or Rb (Examples 6 and 7).
Figure 24:
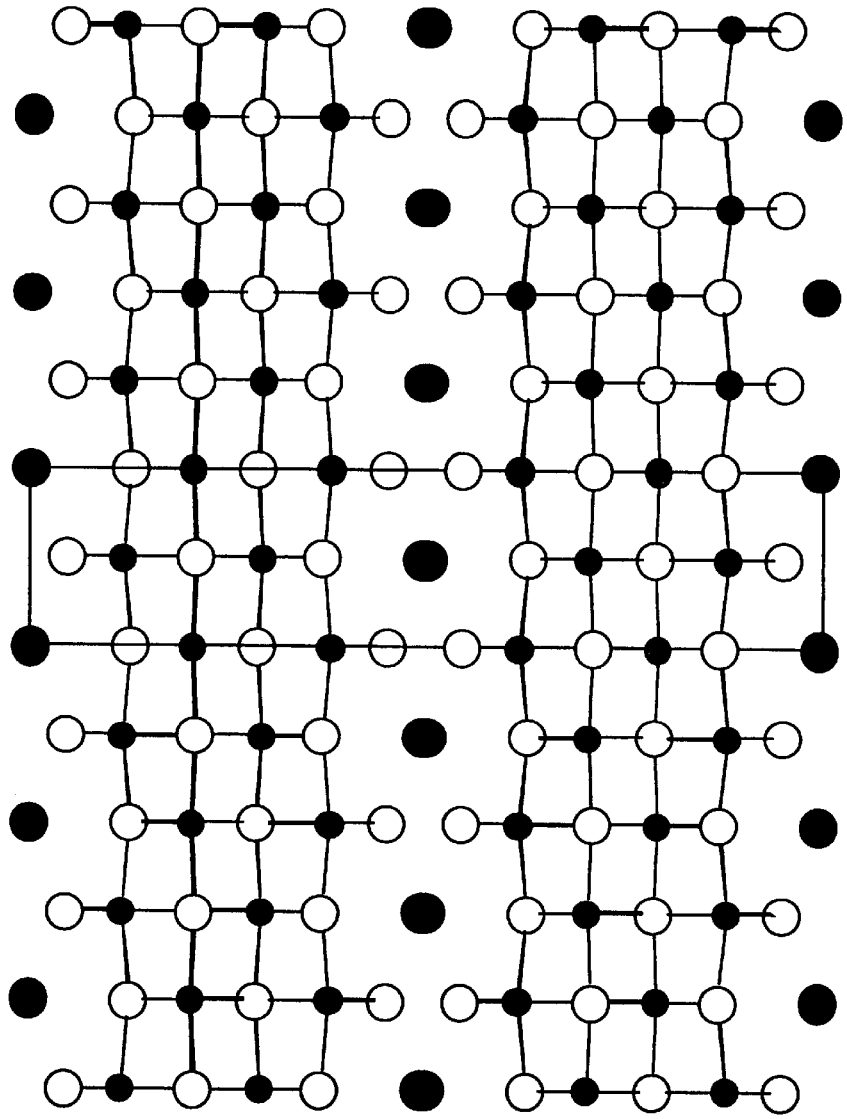
FIG. 24 is a schematic representation of the crystal structure of $Rb_{0.5}Bi_{1.83}Te_3$ (Example 8).

Tables 2, 3 and 4 show crystallographic data and structural analysis for Compounds I, VI and IX. The structures are shown in FIGS. 12, 21 and 24.

TABLE 2

$CsBi_4Te_6$ (I)
Crystal data and structure refinement for $CsBi_4Te_6$.

| | |
|---|---|
| Empirical formula | $CsBi_4Te_6$ |
| Formula weight | 1734.43 |
| Temperature | 293(2) K. |
| Wavelength | 0.71069 A |
| Crystal system | monoclinic |
| Space group | C2/m (#8) |
| Unit cell dimensions | a = 51.9205(8) Å |
| | b = 4.40250(10) Å |
| | c = 14.5118(3) Å |
| | $\alpha$ = 90 deg. |
| | $\beta$ = 101.4800(10) deg. |
| | $\gamma$ = 90 deg. |
| Volume | 3250.75(11) Å$^3$ |
| Z | 8 |
| Density (calculated) | 7.088 g/cm$^3$ |
| Absorption coefficient | 55.899 mm$^{-1}$ |
| F(000) | 5592 |
| Crystal size | 0.028 × 0.051 × 0.307 mm |
| Theta range for data collection | 1.43 to 28.17 deg. |
| Index ranges | $-68 <= h <= 68, -5 <= k <= 5,$ |
| | $-19 <= l <= 18$ |
| Reflections collected | 18450 |
| Independent reflections | 4373 [R(int) = 0.0767] |
| Refinement method | Full-matrix least-squares on F$^2$ |
| Data/restraints/parameters | 4373/0/134 |
| Goodness-of-fit on F$^2$ | 1.050 |
| Final R indices [I > 2$\sigma$(I)] | R1 = 0.0434, wR2 = 0.1017 |
| R indices (all data) | R1 = 0.0585, wR2 = 0.1127 |
| Extinction coefficient | 0.000076(6) |
| Largest diff. peak and hole | 4.344 and −2.490 e. Å$^{-3}$ |

FIGS. 13 to 20 show the structure of and the properties of the $SbI_3$ doped I.

TABLE 3

$Cs_2Bi_8Se_{13}$ (VI)
Crystal data and structure refinement for $Cs_2Bi_8Se_{13}$

| | |
|---|---|
| Empirical formula | $Cs_2Bi_8Se_{13}$ |
| Formula weight | 2964.14 |
| Temperature | 293(2) K |
| Wavelength | 0.71073 Å |
| Crystal system | Monoclinic |
| Space group | P2(1)/m |
| Unit cell dimensions | a = 13.7422(13) Å  α = 90° |
| | b = 4.1526(4) Å  β = 96.813(2)° |
| | c = 25.030(2) Å  γ = 90° |
| Volume | 1418.3(2) Å$^3$ |
| Z | 2 |
| Density (calculated) | 6.941 g/cm$^3$ |
| Absorption coefficient | 68.646 mm$^{-1}$ |
| F(000) | 2432 |
| Crystal size | 0.52 × 0.015 × 0.015 mm$^3$ |
| θ_ range for data collection | 1.49 to 25.08° |
| Index ranges | -16 <= h <= 16, 0 <= k <= 4, 0 <= 1 <= 29 |
| Reflections collected | 6893 |
| Independent reflections | 6893/2801 [R(int) = 0.0981] |
| Completeness to θ = 25.08° | 97.4% |
| Absorption correction | SADABS |
| Max/min transmission | 0.032971/0.008749 |
| Refinement method | Full-matrix least-squares on F$^2$ |
| Data/restraints/parameters | 2801/0/140 |
| Goodness-of-fit on F$^2$ | 0.962 |
| Final R indices [I > 2σ(I)] | R1 = 0.0757, wR2 = 0.1580 |
| R indices (all data) | R1 = 0.1267, wR2 = 0.1764 |
| Extinction coefficient | 0.00000(3) |
| Largest diff. peak and hole | 3.833 and -3.454 e. Å$^{-3}$ |

TABLE 4

$Rb_{0.5}Bi_{1.83}Te_3$ (IX)
Crystal data and structure refinement for $Rb_{0.5}Bi_{1.83}Te_3$.

A. Crystal Data

| | |
|---|---|
| Empirical Formula | $Rb_{0.5}Bi_{1.83}Te_3$ |
| Formula Weight | 807.97 |
| Crystal Color, Habit | silvery, platelet |
| Crystal Dimensions (mm) | 0.050 × 0.050 × 0.730 |
| Crystal System | orthorhombic |
| No. Reflections Used for Unit Cell Determinations (2θ range) | 17(25.6–39.7°) |
| Omega Scan Peak Width at Half-height | 0.51 |
| Lattice Parameters: | a = 6.329(1) Å |
| | b = 28.216(4) Å |
| | c = 4.386(1) Å |
| | V = 783.2(1) Å$^3$ |
| Space Group | Cmcm (#63) |
| Z value | 4 |
| Dcalc | 6.813 g/cm$^3$ |
| F(000) | 1305 |
| μ (Mo K$_α$) | 545.38 cm$^{-1}$ |

B. Intensity Measurements

| | |
|---|---|
| Diffractometer | Rigaku AFC6S |
| Radiation | MoK$_α$ (λ = 0.71069 Å) |
| Temperature | -120° C. |
| Take-off Angle | 6.0° C. |
| Detector Aperture | 6.0 mm horizontal |
| | 6.0 mm vertical |
| Crystal to Detector Distance | 40 cm |
| Scan Type | ω-2θ |
| Scan Rate | 4.0°/min (in omega) |
| Scan Width | (1.57 + 0.30 tanθ)° |
| 2θ$_{max}$ | 49.9° |
| No. of Reflections Measured | Total: 438 |
| Corrections | Lorentz-polarization |
| Absorption | (trans. factors: 0.73–1.16 |
| | Secondary Extinction |
| | (coefficient: 0.88479E-07) |

TABLE 4-continued $Rb_{0.5}Bi_{1.83}Te_3$ (IX)
Crystal data and structure refinement for $Rb_{0.5}Bi_{1.83}Te_3$.

C. Structure Solution and Refinement

| | |
|---|---|
| Structure Solution | Direct Methods |
| Refinement | Full-matrix least-squares |
| Function Minimized | Σ w(\|Fo\| − \|Fc\|)$^2$ |
| Least-squares Weights | 4Fo$^2$/σ$^2$ (Fo$^2$) |
| p-factor | 0.03 |
| Anomalous Dispersion | All non-hydrogen atoms |
| No. Observations (I > 3.00 σ (I)) | 301 |
| No. Variables | 24 |
| Reflection/Parameter Ratio | 12.54 |
| Residuals: R; R$_w$ | 0.054; 0.067 |
| Goodness of Fit Indicator | 2.31 |
| Max Shift/Error in Final Cycle | 0.00 |
| Maximum Peak in Final Diff. Map | 6.34 e$^-$/Å$^3$ |
| Minimum Peak in Final Diff. Map | -3.35 e$^-$/Å$^3$ |

Figure 22:
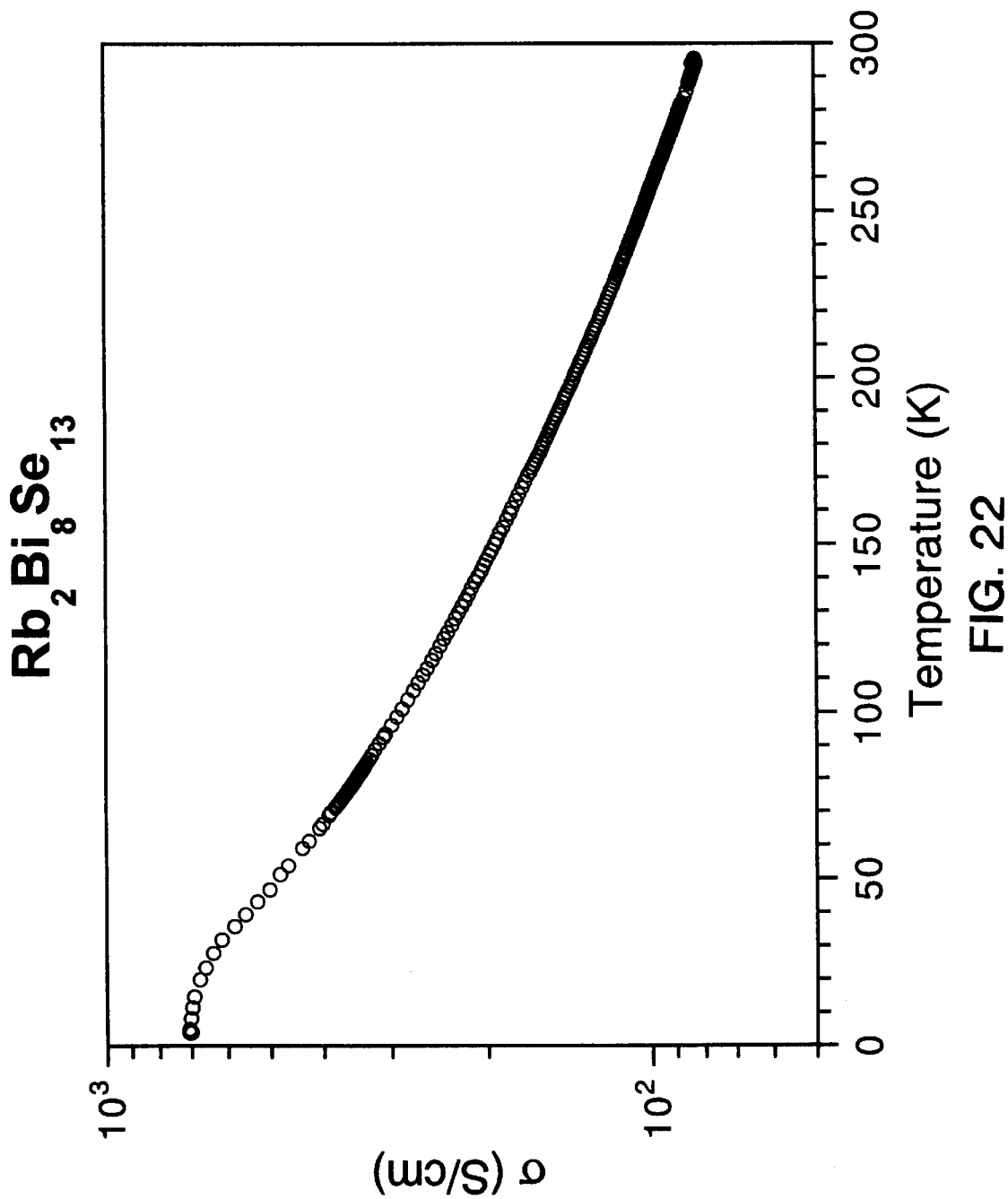
FIGS. 22 and 23 are graphs showing the properties of $Rb_2Bi_8Se_{13}$ (Example 7).
Figure 23:
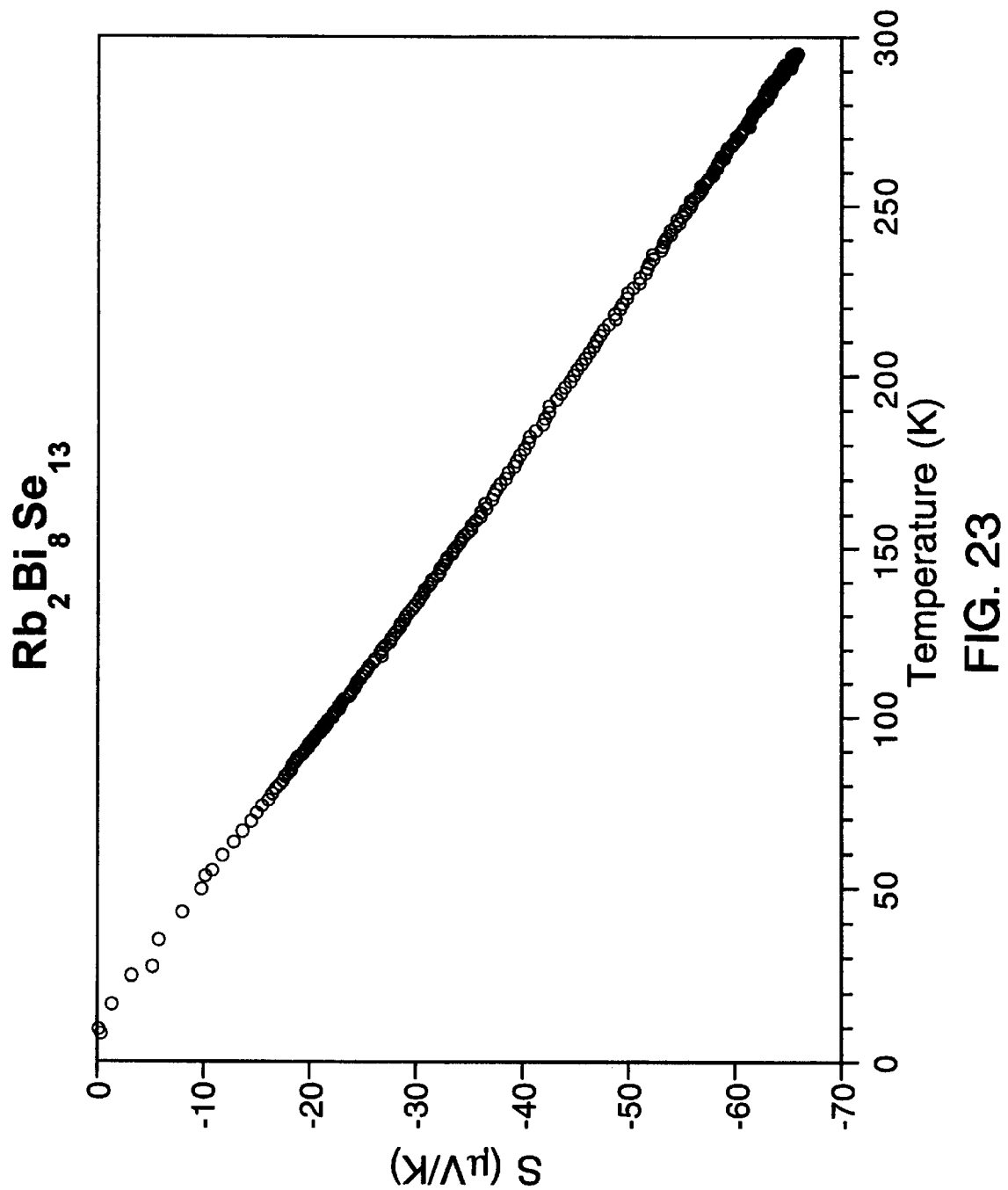

FIGS. 22 and 23 show the properties of VIII.

TABLE 5

| Compound | Sample Type | σ RT (S/cm) | S$_{RT}$* (μV/K) | κ$_{RT}$ (W/m °K.) | mp (° C.) |
|---|---|---|---|---|---|
| $CsBi_4Te_6$ (I) | crystal | >700 | >110 | <2.5 | 545 |
| $Rb_{0.5}Bi_{1.83}Te$ (IX) | crystal | >500 | >25 | — | 540 |
| β-$K_2Bi_8Se_{13}$ (IV) | crystal | >250 | >200 | <2.5 | 672 |
| $K_{2.5}Bi_{8.5}Se_{14}$ (V) | crystal | >1000 | >5 | <2.5 | 692 |
| $Cs_2Bi_8Se_{13}$ (VI) | crystal | >100 | >50 | <2.5 | — |
| $Rb_2Bi_8Se_{13}$ (VII) | crystal | >100 | >70 | <2.5 | 673 |
| $CsBi_4Te_6$:SbI$_3$ (III) (0.2%) | crystal | >800 | >120 | <2.5 | — |
| $CsBi_4Te_6$(BiI$_3$) (III) (0.1%) | crystal | >800 | >70 | <2.5 | — |
| $K_2Bi_4Sb_4Se_{13}$ (VIII) | crystal | >300 | >200 | <2.5 | 616 |

*The thermoelectric power data are the absolute values.

It is intended that the foregoing description be only illustrative of the present invention and that the present invention be limited only by the hereinafter appended claims.

We claim:

1. A chalcogenide compound of the formula $A_xM_yQ_z$ wherein A is selected from the group consisting of Li, Na, K, Rb, Cs and combinations thereof; M is selected from the group consisting of Bi and combinations of Bi and Sb; and Q is selected from the group consisting of Te, Se, and combinations thereof wherein $1 \geq x \geq 6$; $1 \geq y \geq 20$; and $2 \geq z \geq 40$, wherein the Q is negatively charged and charge balanced by M and A which are positively charged; wherein the chalcogenide has an energy band gaps in the range of 0.01 eV<Eg<1.2 eV, wherein eV is electron-volts and Eg is the energy gap, a thermoelectric power S>±50 μV/K, where V is volts and K is degrees Kelvin, electrical conductivity σ>100 S/cm, where S is siemens and cm is centimeters and a thermal conductivity κ<3.0 W/mK, where W is watts, m is meters and K is degrees Kelvin, particularly excluding α-$K_2Bi_8Se_{13}$, $Cs_3Bi_7Se_{12}$, $RbBiSe_2$, $K_3BiTe_3$, $Rb_3BiSe_3$, $Cs_3BiSe_3$ and $K_3BiSe_3$.

2. The chalcogenide compound of claim 1 containing a dopant amount of a transition metal.

3. The chalcogenide compound of claim 1 which contains a dopant amount of a binary compound of a metal.

4. The binary compound of claim 3 which is selected from the group consisting of SnTe, SbI$_3$, BiI$_3$ and In$_2$Te$_3$.

5. The compound of claim 1 which is $CsBi_4Te_6$.

6. The compound of claim 1 which is $CsBi_4Te_{5.5}Se_{0.5}$.

7. The compound of claim 1 which is $CsBi_4Te_6$ doped with $SbI_3$.

8. The compound of claim 1 which is $\beta\text{-}K_2Bi_8Se_{13}$.

9. The compound of claim 1 which is $K_{2.5}Bi_{8.5}Se_{14}$.

10. The compound of claim 1 which is $Cs_2Bi_8Se_{13}$.

11. The compound of claim 1 which is $Rb_2Bi_8Se_{13}$.

12. The compound of claim 1 which is $K_2Bi_{8-m}Sb_mSe_{13}$ where $0<m<8$.

13. The compound of claim 1 as a pelleted powder.

14. The compound of claim 1 as a thermally derived ingot.

15. An electrical device with electrical leads connected to a chalcogenide compound of the formula $$A_xM_yQ_z$$

wherein A is selected from the group consisting of Li, Na, K, Rb, Cs and combinations thereof; M is selected from the group consisting of Bi and combinations of Bi and Sb; and Q is selected from the group consisting of Te, Se, and combinations thereof, wherein $1 \leq x \leq 6$; $1 \leq y \leq 20$; and $2 \leq z \leq 40$, wherein the Q is negatively charged and charge balanced by M and A which are positively charged; wherein the chalcogenide has an energy band gaps in the range of $0.01$ eV$<$Eg$<1.2$ eV, wherein eV is electron-volts and Eg is the energy gap, a thermoelectric power S$>\pm 50$ $\mu$V/K, where V is volts and K is degrees Kelvin, electrical conductivity $\sigma>100$ S/cm, where S is siemens and cm is centimeters and a thermal conductivity $\kappa<3.0$ W/mK, where W is watts, m is meters and K is degrees Kelvin, particularly excluding $\alpha K_2Bi_8Se_{13}$, $Cs_3Bi_7Se_{12}$, $RbBiSe_2$, $K_3BiTe_3$, $Rb_3BiSe_3$, $Cs_3BiSe_3$ and $K_3BiSe_3$.

16. The device of claim 15 wherein the compound contains a dopant amount of a transition metal.

17. The device of claim 15 wherein the compound contains a dopant amount of a binary compound of a metal.

18. The device of claim 17 wherein the binary compound is selected from the group consisting of $SnTe$, $SbI_3$, $BiI_3$ and $In_2Te_3$.

19. The device of claim 15 wherein the compound is $CsBi_4Te_6$.

20. The device of claim 15 wherein the compound is $CsBi_4Te_{5.5}Se_{0.5}$.

21. The device of claim 15 wherein the compound is $CsBi_4Te_6$ doped with $SbI_3$.

22. The device of claim 15 wherein the compound is $\beta\text{-}K_2Bi_8Se_{13}$.

23. The device of claim 15 wherein the compound is $K_{2.5}Bi_{8.5}Se14$.

24. The device of claim 15 wherein the compound is $Cs_2Bi_8Se_{13}$.

25. The device of claim 15 wherein the compound is $Rb_2Bi_8Se_{13}$.

26. The device of claim 15 wherein the compound is $K_2Bi_{8-m}Sb_mSe_{13}$ where $0<m<8$.

27. The device of claim 15 wherein the compound is as a pelleted powder.

28. The device of claim 15 wherein the compound is as a thermally derived ingot.

29. A method for producing a modified electrical current which comprises:

(a) providing an electrical device with electrical leads connected to a chalcogenide compound of the formula $$A_xM_yQ_z$$

wherein A is selected from the group consisting of Li, Na, K, Rb, Cs and combinations thereof; M is selected from the group consisting of Bi and combinations of Bi and Sb; and Q is selected from the group consisting of Te, Se, and combinations thereof, wherein $1 \geq x \geq 6$; $1 \geq y \geq 20$; and $2 \geq z \geq 40$, wherein the Q is negatively charged and charge balanced by M and A which are positively charged; wherein the chalcogenide has an energy band gaps in the range of $0.01$ eV$<$Eg$<1.2$ eV, wherein eV is electron-volts and Eg is the energy gap, a thermoelectric power S$>\pm 50$ $\mu$V/K, where V is volts and K is degrees Kelvin, electrical conductivity $\sigma>100$ S/cm, where S is siemens and cm is centimeters and a thermal conductivity $<3.0$ W/mK, where W is watts, m is meters and K is degrees Kelvin, particularly excluding $\alpha K_2Bi_8Se_{13}$, $Cs_3Bi_7Se_{12}$, $RbBiSe_2$, $K_3BiTe_3$, $Rb_3BiSe_3$, $Cs_3BiSe_3$ and $K_3BiSe_3$; and (b) providing an electrical current through the device through the leads, whereby the current is modified by the chalcogenide compound.

30. The method of claim 29 wherein the chalcogenide compound of claim 29 contains a dopant amount of a transition metal.

31. The method of claim 29 wherein the chalcogenide compound contains a dopant amount of a binary compound of a metal.

32. The method of claim 29 wherein the binary compound is selected from the group consisting of $SnTe$, $SbI_3$, $BiI_3$ and $In_2Te_3$.

33. The method of wherein the chalcogenide compound is $CsBi_4Te_6$.

34. The method of claim 29 wherein the chalcogenide compound is $CsBi_4Te_{5.5}Se_{0.5}$.

35. The method of claim 29 wherein the chalcogenide compound is $CsBi_4Te_6$ doped with $SbI_3$.

36. The method of claim 29 wherein the chalcogenide compound is $\beta\text{-}K_3Bi_8Se_{13}$.

37. The method of claim 29 wherein the chalcogenide compound is $K_{2.5}Bi_{8.5}Se_{14}$.

38. The method of claim 29 wherein the chalcogenide compound is $Cs_2Bi_8Se_{13}$.

39. The method of claim 29 wherein the chalcogenide compound is $Rb_2Bi_8Se_{13}$.

40. The method of claim 29 wherein the chalcogenide compound is $K_2Bi_{8-m}Sb_mSe_{13}$ where $0<m<8$.

41. The method of claim 29 wherein the chalcogenide compound is as a pelleted powder.

42. The method of claim 29 wherein the chalcogenide compound is as a thermally derived ingot.

* * * * *

UNITED STATES PATENT AND TRADEMARK OFFICE
CERTIFICATE OF CORRECTION

PATENT NO. : 6,013,204
DATED : January 11, 2000
INVENTOR(S) : Mercouri G. Kanatzidis et al.

It is certified that error appears in the above-identified patent and that said Letters Patent is hereby corrected as shown below:

Title page,
Item [56], OTHER PUBLICATIONS, "MaCarthy, T.J., et al.", reference, "MaCarthy" should be -- McCarthy --.
"Wendlandt, W.W., et al."reference, "Relfectance" should be -- Reflectance --.
"Scherrer, H., et al.", reference, "Thermolectrics" should be -- Thermoelectrics --.

Column 3,
Line 38, "6A β-$K_2Bi_8$Se13" should be -- 6A β-$K_2Bi_8Se_{13}$ --.

Column 7,
Line 66, "$A_yM_yQ_z$" should be -- $A_xM_yQ_z$ --.

Column 9,
Line 45, "$K_{1.8}Bi_{8.6}$Se13" should be -- $K_{1.8}Bi_{8.6}Se_{13}$ --.

Column 10,
Lines 8 and 9, "tub o" should be -- tube --.

Column 11,
Line 49, "the θ angles" should be -- the 2θ angles --.
Line 50, "8 ≧ 2θ ≧ 28°C" should be -- 8 ≦ 2θ ≦ 28°C --.

Column 12,
Line 5, "$R/_w$=7.4/9.3%" should be -- $R/R_w$=7.4/9.3% --.
Line 25, "λ(MO Kaα), Å" should be -- λ(MoKα), Å --.
Line 34, "$\Sigma\|F_\sigma\|$ -" should be -- $\Sigma\|F_o\|$ - --.

Column 13,
Line 45, "below). overall" should be -- below). Overall --.

Column 15,
Line 59, "a-analogue" should be -- α-analogue --.

UNITED STATES PATENT AND TRADEMARK OFFICE
CERTIFICATE OF CORRECTION

PATENT NO.   : 6,013,204
DATED        : January 11, 2000
INVENTOR(S)  : Mercouri G. Kanatzidis et al.

It is certified that error appears in the above-identified patent and that said Letters Patent is hereby corrected as shown below:

Column 16,
Line 20, "$\alpha$-K$_2$Bi$_8$Se13" should be -- $\alpha$-K$_2$Bi$_8$Se$_{13}$ --.

Column 17,
Line 38, "$K_c$ contribution" should be -- $K_e$ contribution --.

Column 22,
Line 44, "$\beta$-K$_3$Bi$_8$Se$_{13}$" should be -- $\beta$-K$_2$Bi$_8$Se$_{13}$ --.

Signed and Sealed this

Twenty-first Day of October, 2003

JAMES E. ROGAN
*Director of the United States Patent and Trademark Office*